(12) United States Patent
Rankin et al.

(10) Patent No.: US 8,519,824 B1
(45) Date of Patent: Aug. 27, 2013

(54) CUSTOMIZABLE SERVICE SPACE

(75) Inventors: Richard L. Rankin, Lake Stevens, WA (US); Nino Senoadi, Bothell, WA (US); Karen Cavalier Bradshaw, Brier, WA (US); Erik Ivar Wiman, Lake Stevens, WA (US); Robert J. Bengtsson, Mukilteo, WA (US); Buddy Lee Sharpe, Mill Creek, WA (US); Mark Edward Wentland, Lynwood, WA (US); Shawn Claflin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 556 days.

(21) Appl. No.: 12/688,155

(22) Filed: Jan. 15, 2010

Related U.S. Application Data

(60) Provisional application No. 61/169,118, filed on Apr. 14, 2009.

(51) Int. Cl.
*H04Q 5/22* (2006.01)

(52) U.S. Cl.
USPC ...................................... 340/10.1; 244/118.5

(58) Field of Classification Search
USPC ...................................... 340/10.1; 244/118.5
See application file for complete search history.

(56) References Cited

U.S. PATENT DOCUMENTS

| | | | | | |
|---|---|---|---|---|---|
| 4,055,317 | A | * | 10/1977 | Greiss ......................... | 244/118.5 |
| 4,079,904 | A | * | 3/1978 | Groskopfs et al. ......... | 244/172.5 |
| 6,323,782 | B1 | * | 11/2001 | Stephens et al. ........... | 340/10.31 |
| 6,761,332 | B1 | * | 7/2004 | Bengtsson ................. | 244/118.5 |
| 7,098,555 | B2 | * | 8/2006 | Glahn et al. ................ | 307/32 |
| 7,954,761 | B2 | * | 6/2011 | Johnson et al. ............ | 244/118.5 |
| 2004/0057177 | A1 | * | 3/2004 | Glahn et al. ............... | 361/62 |
| 2004/0075533 | A1 | * | 4/2004 | Ives et al. .................. | 340/5.73 |
| 2005/0023413 | A1 | | 2/2005 | Saint-Jalmes | |
| 2005/0121978 | A1 | * | 6/2005 | McAvoy ..................... | 307/43 |
| 2006/0144935 | A1 | * | 7/2006 | Gross ......................... | 235/383 |
| 2006/0145002 | A1 | * | 7/2006 | Van Loon ................. | 244/118.1 |
| 2007/0194019 | A1 | * | 8/2007 | Seagle et al. .............. | 220/4.08 |
| 2007/0215433 | A1 | * | 9/2007 | Logan et al. .............. | 194/209 |
| 2007/0228216 | A1 | * | 10/2007 | Wenstrom .................. | 244/118.5 |
| 2008/0001031 | A1 | * | 1/2008 | Doebertin et al. ......... | 244/118.1 |
| 2008/0078871 | A1 | * | 4/2008 | Munson et al. ............ | 244/118.5 |
| 2008/0100450 | A1 | | 5/2008 | Ayyagari et al. | |
| 2008/0116318 | A1 | * | 5/2008 | Wesley et al. ............. | 244/118.5 |
| 2010/0155391 | A1 | * | 6/2010 | Koschberg et al. ........ | 219/672 |

OTHER PUBLICATIONS

PCT Search Report for application PCT/US2010/030931 dated May 17, 2011.
"TZ Locking: TZ Intevia Radial 4120CF", retrieved Jan. 14, 2010, 1 page http://www.tz.net/products/tz-radial-4120CF/.
"Welcome to TZ Products", retrieved Jan. 14, 2010, pp. 1-2 http://www.tz.net/products/.

* cited by examiner

*Primary Examiner* — George Bugg
*Assistant Examiner* — Naomi Small
(74) *Attorney, Agent, or Firm* — Yee & Associates

(57) ABSTRACT

A modular environment for a vehicle. The modular environment may include a configurable service space with a mounting system within the vehicle that has a number of modules configured to releaseably engage the mounting system. The module environment also may include a service space control system able to electronically communicate with and identify at least one of the modules. The modular environment may also include an arch framework that supports a number of fixed modules and a number of configurable modules. A further embodiment is shown of a method for using a service space control system that controls a modular environment for a vehicle having a configurable service, and including a mounting system configured to releaseably engage a number of modules in a service space. The service space control system electronically communicates with and can identify at least one of the modules and limit its use to only authorized users.

20 Claims, 27 Drawing Sheets

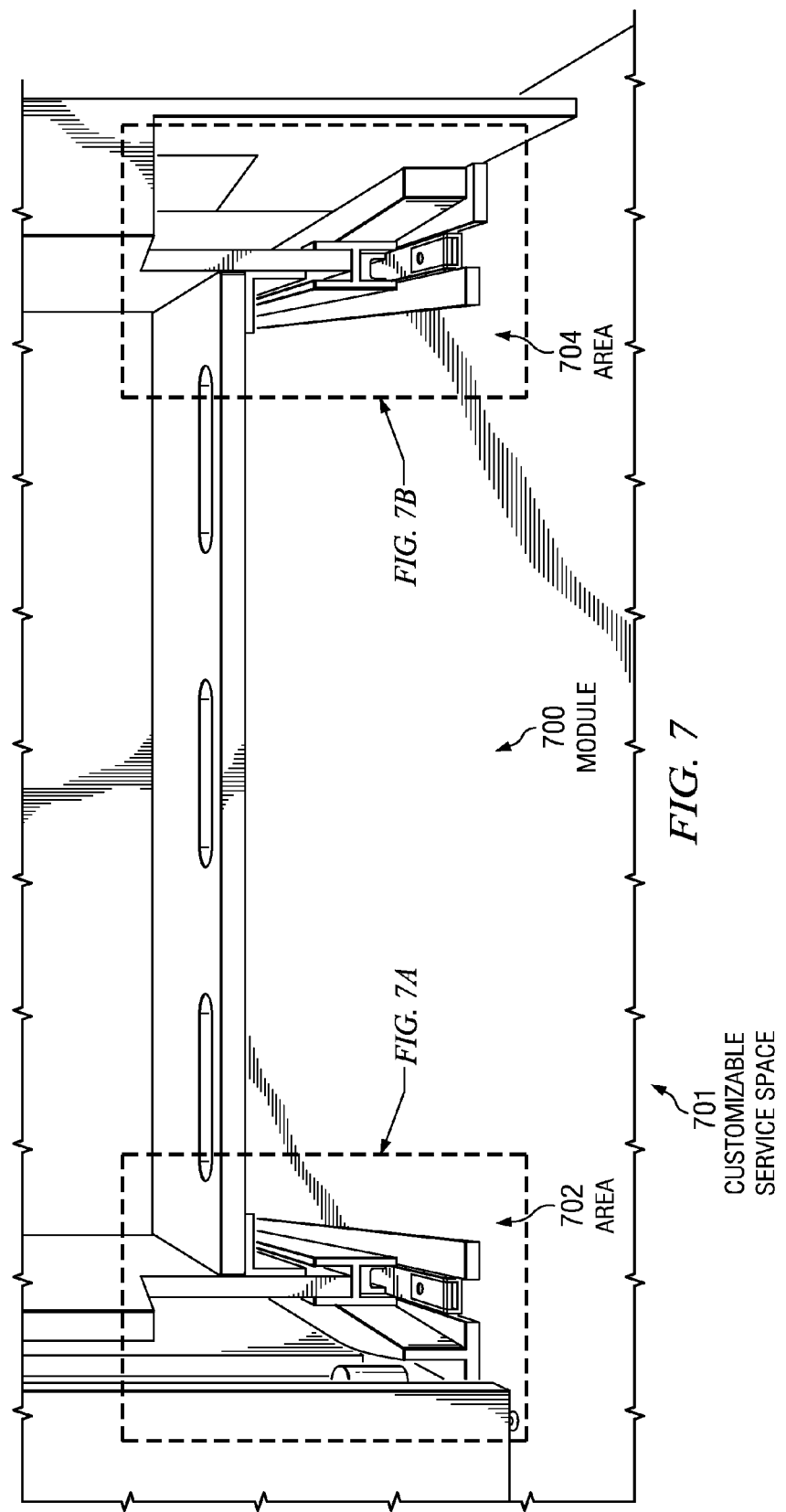

FIG. 25

PASSENGER CONNECTIONS SCREEN 2500

32 Connecting Passengers

| Connection | Time | Gate | Status |
|---|---|---|---|
| Orlando, FL | 12:35 PM | C17 | waiting |
| London, England | 1:10 PM | A2 | boarding |
| New York City, NY | 3:50 PM | D8 | — |
| Raleigh, NC | 2:23 PM | C5 | — |
| Madrid, Spain | 12:20 PM | A16 | taxiing |
| Portland, ME | 6:50 PM | D12 | — |
| Providence, RI | 1:30 PM | C6 | boarding |
| Los Angeles, CA | 12:25 PM | F18 | taxiing |

NUMBER OF CONNECTING PASSENGERS 2502

| | | | |
|---|---|---|---|
| Tallahassee, FL | 1:10 PM | A2 | boarding |
| New York City, NY | 3:50 PM | D8 | — |
| Raleigh, NC | 2:23 PM | C5 | — |
| Madrid, Spain | 12:20 PM | A16 | taxiing |
| Portland, ME | 6:50 PM | D12 | — |
| Providence, RI | 1:30 PM | C6 | boarding |
| Syracuse, NY | 6:50 PM | D12 | — |
| Orlando, FL | 12:35 PM | C17 | waiting |
| London, England | 1:10 PM | A2 | boarding |
| New York City, NY | 3:50 PM | D8 | — |
| Raleigh, NC | 2:23 PM | C5 | — |
| Madrid, Spain | 12:20 PM | A16 | taxiing |
| Portland, ME | 6:50 PM | D12 | — |
| Providence, RI | 1:30 PM | C6 | boarding |
| Syracuse, NY | 5:50 PM | D12 | — |
| Orlando, FL | 12:35 PM | C17 | waiting |
| London, England | 1:10 PM | A2 | boarding |

STATUS OF CONNECTING FLIGHTS 2504 passengers already boarding

CUSTOMIZABLE SERVICE SPACE

The present invention is related to and claims the benefit of priority of provisional U.S. Patent Application Ser. No. 61/169,118 entitled "Customizable Service Space," filed on Apr. 14, 2009, which is hereby incorporated by reference.

BACKGROUND INFORMATION

1. Field

The present disclosure relates generally to airplanes and in particular to a modular environment in an airplane and more particularly to a customizable service space within a modular environment in an airplane.

2. Background

Historically, galley areas on airplanes are configured at purchase to meet specific customer requirements for an airline carrier. The configuration requirements at time of purchase are typically directed toward current market conditions at the time of purchase. Galley suppliers have standard designs and the customers may modify them to a limited extent during the initial configuration at the time of purchase.

As the markets change, airlines modify the services and products that they offer during in-flight service. Airlines may seek to modify or decrease the in-flight service equipment on an airplane in order to reduce weight or cost, or change the food or beverage service offerings to increase revenues and lower costs. Modifications of the initial configuration implemented after the time of initial purchase are costly, time consuming, and in some cases because of mod-shop quality control may compromise the integrity of the galley area components due to work-arounds for modifications that were not planned for initially. Airplanes undergoing modifications, usually in concert with other modifications, may be out of service for extended periods of time in order to complete the modifications. This time out of service adds lost revenue to the already high costs of reconfiguring the at purchase design.

Therefore, it would be advantageous to have a method and apparatus that takes into account one or more of the issues discussed above, as well as possibly other issues.

SUMMARY

The different advantageous embodiments provide an apparatus for customizing a service space comprising the service space and a number of modules. The service space is capable of being configured. The number of modules is capable of being removeably attached in a number of locations in the service space.

The different advantageous embodiments further provide a method for customizing a service space using a service space control system. User input is detected through a user interface. An identification screen is presented using the user interface. Identification information is received. A determination is made as to whether a user is authorized to use the service space control system using the identification information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIGS. 7, 7A, and 7B are an illustration of a module in accordance with an illustrative embodiment;

FIG. 25 is an illustration of a passenger connections screen in accordance with an illustrative embodiment;

DETAILED DESCRIPTION

Figure 1:
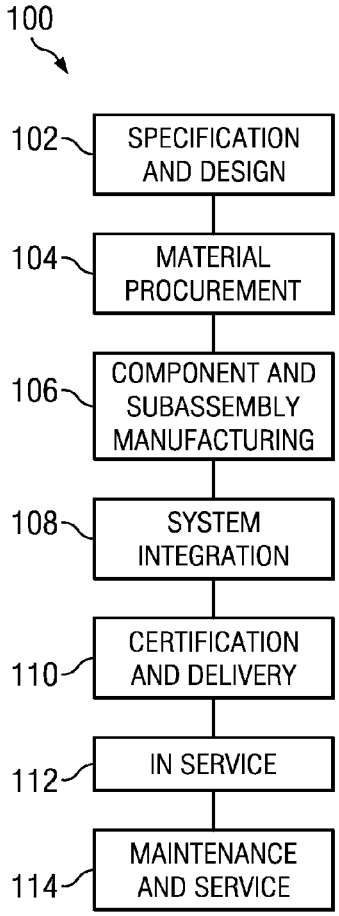
FIG. 1 is an illustration of an aircraft manufacturing and service method in accordance with an advantageous embodiment.
Figure 2:
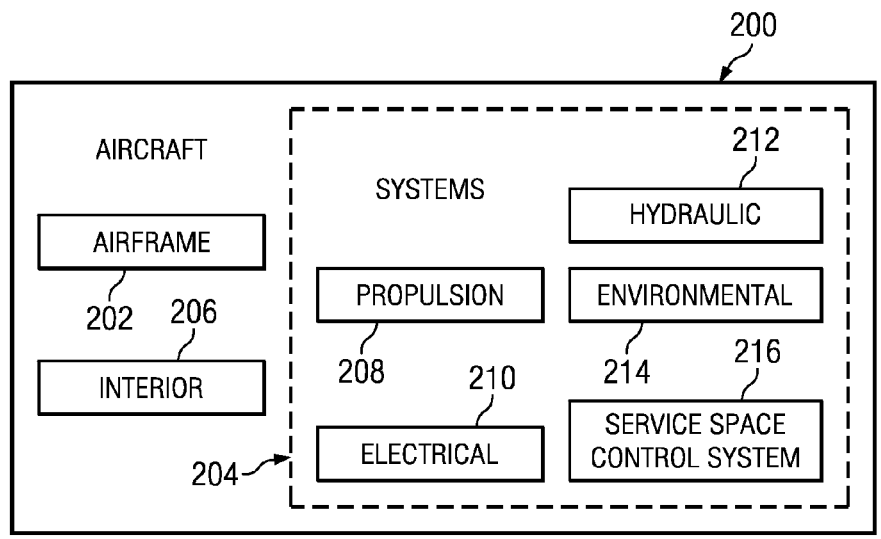
FIG. 2 is illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104. Initial configuration of a customizable service space may take place during specification and design 102 of aircraft 200, for example. A customizable service space may be an area in a vehicle that is configured to be modified or changed.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and service space control system 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be inspected while aircraft 200 is in maintenance and service 114 in FIG. 1.

Also, one or more apparatus embodiments, method embodiments, or a combination thereof may be utilized during service stages, such as maintenance and service 114 and in service 112 in FIG. 1, for example, without limitation, by substantially expediting the inspection and/or maintenance of aircraft 200. As another example, some advantageous embodiments may be used during in service 112. These advantageous embodiments may be used, for example, between flights without requiring maintenance and service 114 normally used to reconfigure or modify the interior service areas of an airplane.

The different advantageous embodiments take into account and recognize that currently used galley area configurations for airplanes are configured at purchase to accommodate current market conditions. Standard designs are used and may be modified slightly at initial configuration to meet specific airline customer requirements. However, the different advantageous embodiments recognize that as the market changes, airlines wish to modify the service and products they offer during in-flight service in order to reduce cost, increase revenue, or both. Modification from the initial at purchase configuration is both costly and time-consuming, and is often poorly executed because the modification desired was not originally anticipated by the initial configuration of the galley area.

The different advantageous embodiments take into account and recognize that current customers of transportation vehicles need a way to efficiently and economically customize the on-board service and product offerings to meet changing conditions. In some cases, current customers purchase standard galley equipment in order to make their airplane attractive for resale at a later date. The galley area configuration in this case is not designed for the current airline customer's in-flight service needs but rather strictly for resale considerations so that costly reconfigurations will not be necessary by the new purchaser at the time of resale.

The different advantageous embodiments also take into account and recognize that airline carriers currently offer in-flight services and products, such as food and beverage service for example. In order to supply drinking water to passengers, an airplane must be stocked with bottled drinking water. Bottled drinking water adds cost to the operations, weight considerations, and a large amount of excess trash. In addition, flight attendants may not have a dedicated hand washing station, and may rely on airplane lavatories, which must be shared with passengers.

Furthermore, the different advantageous embodiments also take into account and recognize that there is a lack of trash storage space on current airplanes. In part due to the bottled drinking water, and also due to the other beverages and food served and brought onto the plane by passengers, there is an increase in trash during in-flight service. Plastic bottles in particular may take up excessive space and airplane galleys have limited storage space in current configurations. Multiple small trash bags are often filled and hung on the front of galley units, stored in lavatories, or stashed elsewhere throughout the airplane, such as underneath a seat.

Thus, one or more of the different advantageous embodiments may provide an apparatus for customizing a service space comprising the service space and a number of modules. The service space is capable of being configured. The number of modules is capable of being removeably attached in a number of locations in the service space.

The different advantageous embodiments further provide a method for customizing a service space using a service space control system. User input is detected through a user interface. An identification screen is presented using the user interface. Identification information is received. A determination is made as to whether a user is authorized to use the service space control system using the identification information.

The different advantageous embodiments may provide a wireless communications system that may be capable of providing communications with the customizable service space and/or modules within the modular environment. The computer system may be capable of generating commands and processes for the customizable service space and/or number of modules in the modular environment and communicating the commands and processes to the customizable service space and/or number of modules to configure the customizable service space.

As a specific illustrative example, one or more of the different advantageous embodiments may be implemented, for example, without limitation, during at least one of component and subassembly manufacturing 106, system integration 108, certification and delivery 110, in service 112, and maintenance and service 114 in FIG. 1 to assemble a structure for aircraft 200. As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

Figure 3:
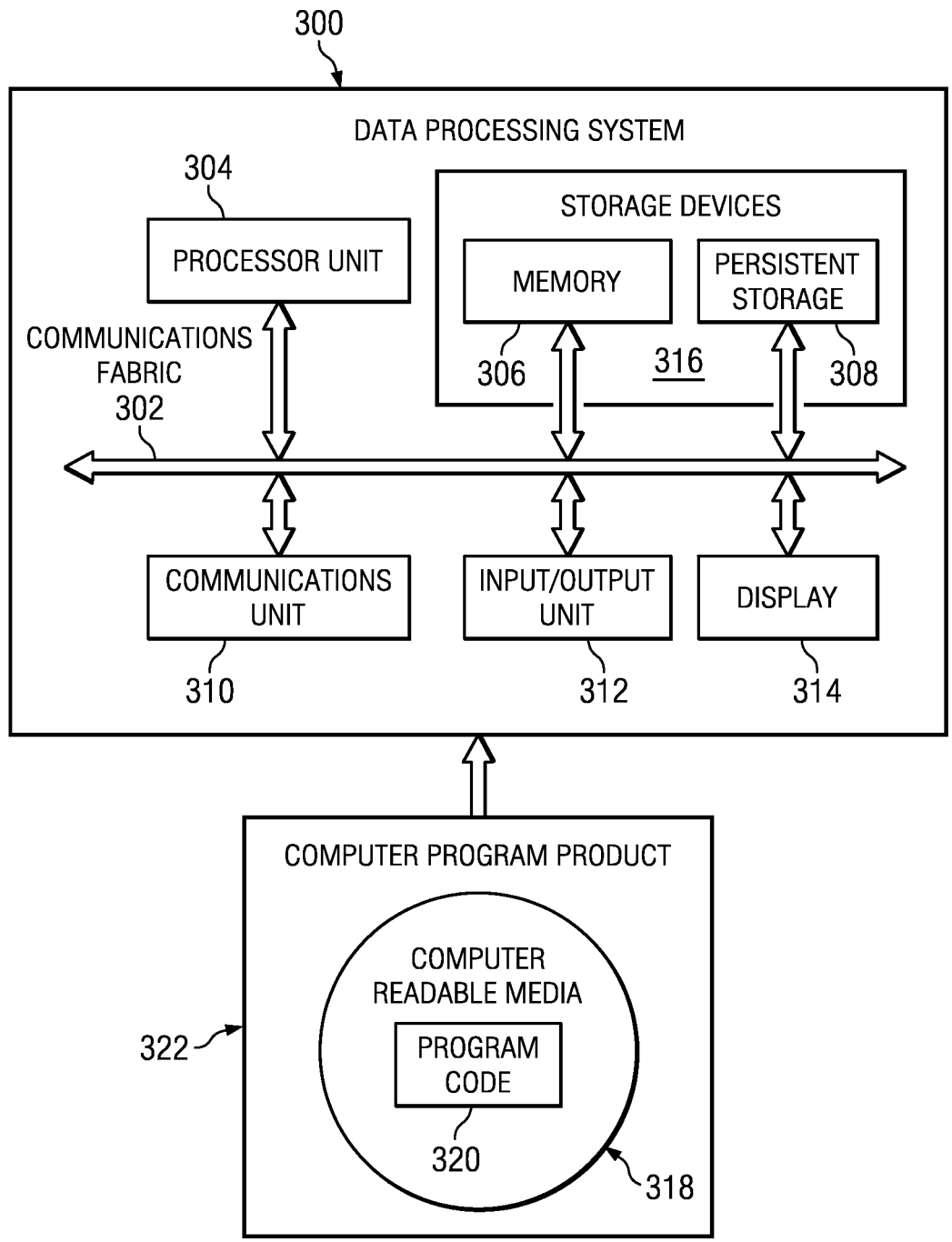
FIG. 3 is an illustration of a data processing system in accordance with an illustrative embodiment.

With reference now to FIG. 3, an illustration of a data processing system is depicted in accordance with an illustrative embodiment. Data processing system 300 may be used to implemented different computers and data processing systems within a modular environment, such as modular environment 400 in FIG. 4.

In this illustrative example, data processing system 300 includes communications fabric 302, which provides communications between processor unit 304, memory 306, persistent storage 308, communications unit 310, input/output (I/O) unit 312, and display 314. Depending on the particular implementation, different architectures and/or configurations of data processing system 300 may be used.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device may be any piece of hardware that may be capable of storing information, such as, for example without limitation, data, program code in functional form, and/or other suitable information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 may be a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications and/or programs may be located in storage devices 316, which are in communication with processor unit 304 through communications fabric 302. In these illustrative examples the instruction are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 320 may be located in a functional form on computer readable media 318 that may be selectively removable and may be loaded onto or transferred to data processing system 300 for execution by processor unit 304. Program code 320 and computer readable media 318 form computer program product 322 in these examples. In one example, computer readable media 318 may be in a tangible form, such as, for example, an optical or magnetic disc that may be inserted or placed into a drive or other device that may be part of persistent storage 308 for transfer onto a storage device, such as a hard drive that may be part of persistent storage 308. In a tangible form, computer readable media 318 also may take the form of a persistent storage, such as a hard drive, a thumb drive, or a flash memory that may be connected to data processing system 300. The tangible form of computer readable media 318 may also be referred to as computer recordable storage media. In some instances, computer readable media 318 may not be removable.

Alternatively, program code 320 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 320 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 320 may be a server computer, a client computer, or some other device capable of storing and transmitting program code 320.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 may be any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
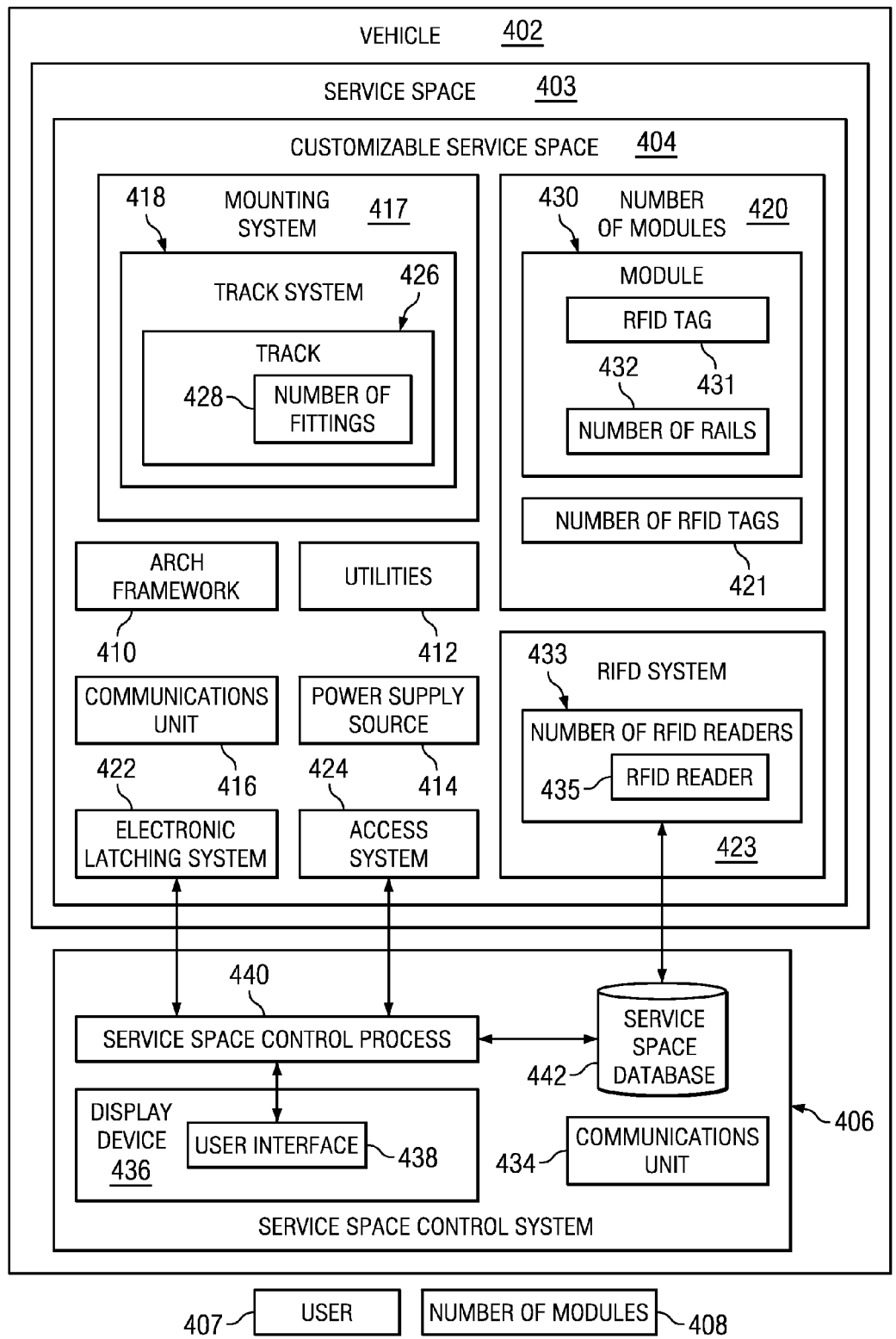
FIG. 4 is an illustration of a modular environment in accordance with an illustrative embodiment.

With reference now to FIG. 4, an illustration of a modular environment is depicted in accordance with an illustrative embodiment. In one illustrative example, modular environment 400 may be implemented in an aerospace environment. Although an aerospace example is shown, different advantageous embodiments may be applied to other industries, such as the automotive industry for example.

Modular environment 400 may contain vehicle 402. Vehicle 402 may be any type of vehicle such as, without limitation, an aircraft, train, ship, bus, spacecraft, submarine, and/or any other suitable transportation vehicle. Vehicle 402 may contain service space 403 and service space control system 406. Service space 403 is an area in vehicle 402 that is capable of being configured and/or reconfigured for different uses. In these examples, service space 403 may be referred to as customizable service space 404. Modular environment 400 may also include number of modules 408.

Customizable service space 404 may include arch framework 410, utilities 412, power supply source 414, communications unit 416, mounting system 417, track system 418, number of modules 420, electronic latching system 422, radio frequency identification system 423, and access system 424. Arch framework 410 may be a fixed basic unit that includes distinct spaces for modular components. Arch framework 410 is sized to fit within customizable service space 404 of vehicle 402. In an illustrative example of an aircraft, customizable service space 404 may be an aircraft fuselage and arch framework 410 may be sized to the aircraft fuselage and adaptable to any number of different aircraft fuselage cross sections. For example, arch framework 410 may be implemented in the aft section of an aircraft fuselage, a mid-cabin section of an aircraft fuselage, and/or any other suitable location within an aircraft fuselage.

Utilities 412 may provide electricity, water, sewage disposal, and/or any other suitable utility. Utilities 412 may include, without limitation, electrical components and plumbing components. Utilities 412 may be pre-populated within customizable service space 404 to provide utility services to any number of different modules in any number of different configurations within customizable service space 404. For example, utilities 412 may be distributed throughout customizable service space 404 in order to provide utility access to number of modules 420 at any location within customizable service space 404. As used herein, a number refers to one or more modules and/or one or more configurations.

Power supply source 414 may be a master power supply that may provide power to a number of modules inserted into a modular space of a customizable service space, such as number of modules 420. In an illustrative example, power supply source 414 may be routed from the back wall of customizable service space 404 to an Aeronautical Radio, Incorporated (ARINC) standard electrical connector. The opposite fitting for the electrical connector may be located on the back surface of a module. When a module is installed the connectors lock and power is then transferred to the systems in the module. Power supply source 414 may include, without limitation, a battery, a mobile battery recharger, a networked autonomous battery recharger, energy harvesting devices, photo cells, and/or other suitable power sources.

Communications unit 416, in these examples, provides for communications with other data processing systems or devices. Communications unit 416 may be an example of one implementation of communications unit 310 in FIG. 3, for example. Communications unit 416 may include, for example, without limitation, transmitters, receivers, transceivers, and/or other suitable types of communication devices.

Mounting system 417 includes track system 418. Track system 418 may include a number of tracks disposed along the floor surface of customizable service space 404 for accepting number of modules 420. For example, track 426 may be a track in track system 418. Track 426 may have number of fittings 428. Number of fittings 428 may be any type of fitting, including, without limitation, a latching fitting, pin, fastener, slider, and/or any other suitable fitting. Number of modules 420 may include module 430. Module 430 may have number of rails 432 disposed along the bottom surface of module 430. Number of rails 432 may be, without limitation, slotted rails. Number of rails 432 may engage track system 418. In an illustrative example, module 430 may be inserted into customizable service space 404 using number of rails 432 and track system 418 to align module 430 into a distinct modular space of customizable service space 404. In this example, number of fittings 428 of track 426 may engage number of rails 432 of module 430 in order to assist with the insertion of module 430 into customizable service space 404.

In an illustrative example, number of fittings 428 may be teeth fittings that engage with a slotted rail, for example. In this illustrative example, the teeth fittings may be dispersed along the front and rear of a track on the floor of a customizable service space. This illustrative assembly has a connecting rod between the forward and aft fitting and a pull pin and latch that are connected to the forward fitting. Once the pin is pulled and the latch is unlatched the fitting assembly can be pulled forward, thus sliding the teeth fittings forward without tools and disconnecting the module from the H-section attachment rail.

Number of modules 420 may be any type of modular component suitable for customizable service space 404. For example, number of modules 420 may include, without limitation, a lavatory, a self-service vending machine, a seating area, a retail space, a bar unit, a storage unit, a countertop unit, a business center, a desk unit, conventional galley units with industry standard inserts, and/or any other suitable module. Conventional galley units with industry standard inserts may include, without limitation, ovens, coffee makers, hot cups, galley carts, food storage units, beverage storage units, and/or any other suitable unit.

Number of modules 420 may include number of radio frequency identification tags 421. In one advantageous embodiment, radio frequency identification system 423 may include number of radio frequency identification readers 433. Number of radio frequency identification tags 421 may provide information about the module, such as, without limitation, identification of module, type of module, content of module, status of module, health of module, and/or any other suitable information. Each module in number of modules 420 may have a unique radio frequency identification tag that identifies the module to customizable service space 404 using number of radio frequency identification readers 433. For example, module 430 may include radio frequency identification tag 431. A module may have a number of radio frequency identification tags located throughout the module. As used herein, a number refers to one or more radio frequency identification tags.

In one illustrative example, module 430 may be a galley module that contains meals for in-flight meal service. Each meal package or tray within module 430 may have its own radio frequency identification tag in order to track the number of meals in the galley module at any given time. When the meals are inserted into module 430 and module 430 is placed in customizable service space 404, radio frequency identification reader 435 may scan module 430 and record all of the radio frequency identification tags in module 430, including radio frequency identification tag 431. The data collected from the scan may then be compared to a database that contains food information, for example, to determine whether the correct number of meals have been supplied by the food provider. In another example, the data may be used to monitor the number of meals remaining, or the number of a certain type of meal remaining. A type of meal may be, without limitation, a vegetarian meal, a beef meal, a chicken meal, a breakfast meal, a lunch meal, a dinner meal, and/or any other suitable type of meal. As the meals are depleted during meal service, radio frequency identification reader 435 in customizable service space 404 may provide real time information to service space control system 406 as to the amount and type of food remaining. This data may be accessed over user interface 438 and displayed on display device 436.

Radio frequency identification reader 435 is an example of a reader in number of radio frequency identification readers 433 that may detect radio frequency identification tag 431 when module 430 is inserted into customizable service space 404. Radio frequency identification reader 435 may transmit the identification information detected from radio frequency identification tag 431 to service space control system 406 using communications unit 416. The identification information may be stored in service space database 442 and/or processed by service space control process 440.

Radio frequency identification system 423 may be located within customizable service space 404 in a location that provides number of radio frequency identification readers 433 access to number of radio frequency identification tags 421 on number of modules 420 when a module is inserted into customizable service space 404. The location may be, for example, on the back wall of customizable service space 404, or on the floor surface of customizable service space 404. In an illustrative example, when module 430 is installed into customizable service space 404, radio frequency identification reader 435 may read radio frequency identification tag 431. Radio frequency identification reader 435 may then use service space database 442 to identify module 430 and record information about module 430. Information recorded may include, for example, they type and/or quantity of contents within module 430.

In an advantageous embodiment, service space control system 406 uses information detected by number of radio frequency identification readers 433 to identify the types of modules inserted into customizable service space 404 as well as other information about the modules. For example, service space control system 406 will know the difference between a galley module and a lavatory module and update the system with the information about the current modules in customizable service space 404. The information may be stored in service space database 442 and may be used for maintenance and certification purposes.

Radio frequency identification system 423 is used as an electronic means of recording configuration control instead of manually recording data. The description of radio frequency identification system 423 is provided for illustrative purposes and does not limit the methods by which information may be recorded in this invention. Any other suitable method for recording information may be used, such as, without limitation, bar codes to record information about the modules.

Electronic latching system 422 may be capable of electronically securing number of modules 420 after insertion into customizable service space 404. Electronic latching system 422 may also be capable of electronically releasing number of modules 420 for removal from customizable service space 404. In an illustrative example, electronic latching system 422 may use a radial fastener with the electronic component installed on the back wall of customizable service space 404 and the fitting installed on the back of the modules, such as number of modules 420. When a module, such as module 430, is slid into place, electronic latching system 422 locks and sends a signal to service space control system 406 indicating module 430 is locked into place. In order to unlock a module, a user may select a maintenance mode from a function selection of service space control process 440 over user interface 438. In the maintenance mode, a user may select the module to unlock, and service space control system 406 may send a signal to electronic latching system 422 to release the module.

Access system 424 may be capable of allowing and/or restricting access to number of modules 420 based on the individual attempting access to one or more of number of modules 420. For example, module 430 of number of modules 420 may be a restricted access module that allows access to authorized personnel only.

Service space control system 406 may provide for communication with and control of the different components of customizable service space 404. Service space control system 406 may be an example of one implementation of data processing system 300 in FIG. 3. Service space control system 406 may be an example of one implementation of service space control system 216 on aircraft 200 in FIG. 2, for example. Service space control system 406 may include communications unit 434, display device 436, user interface 438, service space control process 440, and service space database 442.

Communications unit 434 may be similar to communications unit 416. Communications unit 434 may be an example of one implementation of communications unit 310 in FIG. 3, for example. Communications unit 434, in these examples, provides for communications with the different components of customizable service space 404. Communications unit 434 may include, for example, without limitation, transmitters, receivers, transceivers, and/or other suitable types of communication devices.

Display device 436 may be an example of one implementation of display 314 in FIG. 3. Display 436 may include user interface 438. User interface 438 may enable interaction with service space control process 440 by a user, such as user 407. User 407 may be, without limitation, a human operator, an external system, and/or any other suitable user of service space control process 440. A human operator may include a number of personnel, such as, for example, without limitation, flight attendants, maintenance workers, service staff, and/or any other suitable personnel for vehicle 402.

Service space control process 440 may interact with user interface 438 to receive input from a user and present information to the user. Service space control process 440 may analyze input from a user, generate a number of commands based on the input, and send the number of commands to one or more components of customizable service space 404. For example, if a flight attendant attempts to access a specific module, such as module 430 in number of modules 420, service space control process 440 may first analyze the input from the flight attendant, such as verification information, and determine whether the flight attendant is authorized to access module 430. Service space control process 440 may determine that the flight attendant is an authorized person, and send a command to access system 424 to allow access to module 430. In an illustrative example, access system 424 may allow access by releasing a lock mechanism of a door for module 430, for example. In another illustrative example, a maintenance worker may input data into user interface 438 requesting release of module 430 for removal from customizable service space 404. Service space control process 440 may first analyze the input to determine if the maintenance worker is an authorized person. Upon determining that the maintenance worker is an authorized person, service space control process 440 may then send a command to electronic latching system 422 to release module 430 from customizable service space 404.

Service space database 442 may include information such as, without limitation authorized personnel identification information and access authorization, specification information for a number of different service spaces, specification information for a number of different modules, and/or any other suitable information.

In an illustrative example, customizable service space 404 may be initially configured with number of modules 420. A new configuration request may be generated or received by service space control process 440. The new configuration request may be, for example, a new customized service space configuration. In an illustrative example, new configuration requests may be generated by a user using service space control system 406, for example, or may be generated by an external system and transmitted to service space control system 406. Service space control process 440 may identify which of the existing modules in number of modules 420 meet the new requirements of the new configuration request, if any. For example, module 430 may be a storage unit currently inserted into a distinct space where the new configuration request has also required the same storage unit. In this illustrative example, service space control process 440 may identify module 430 as a module that may remain in the new configuration, and send a command to electronic latching system 422 to retain module 430 in the secure position, while releasing the other modules of number of modules 420. Number of modules 408 may then be inserted in place of number of modules 420 that are removed, for example, in order to fulfill the new configuration request.

The illustration of modular environment 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, the components of service space control system 406 may be distributed throughout modular environment 400 or across locations remote from modular environment 400. Service space database 442 may be located in a remote location from service space control system 406 or may be integrated with service space control system 406. Further, a particular module within number of modules 420 or number of modules 408 may be used for more than one purpose.

Figure 5:
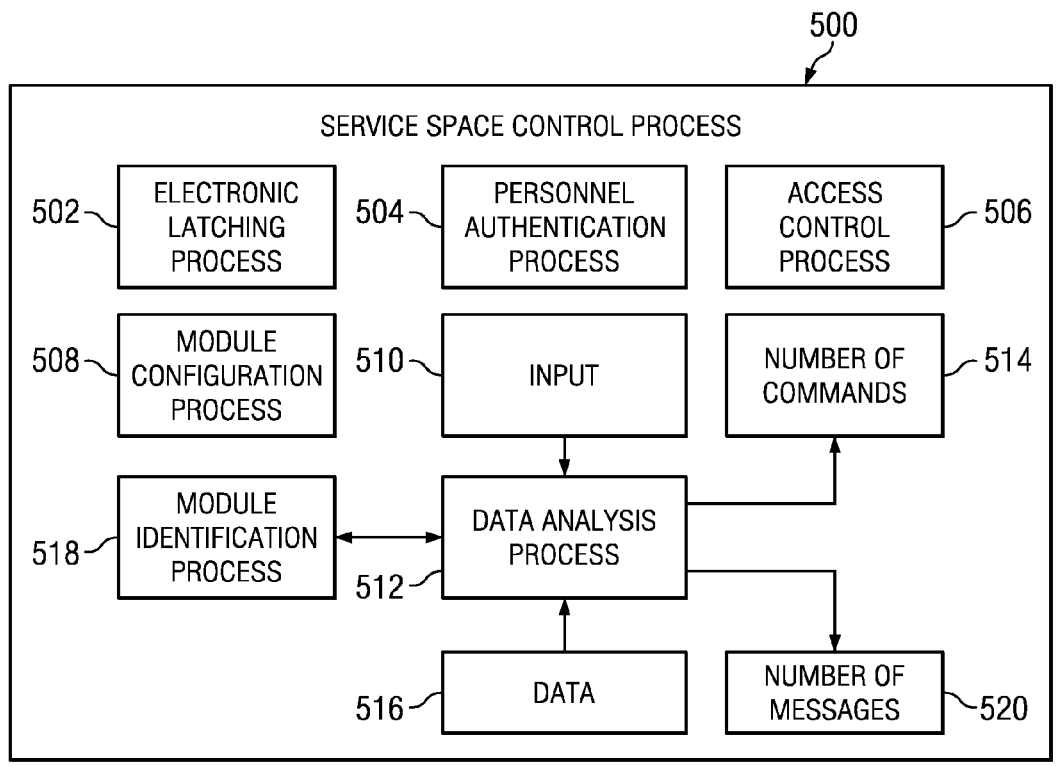
FIG. 5 is an illustration of a service space control process in accordance with an illustrative embodiment.

With reference now to FIG. 5, an illustration of a service space control process is depicted in accordance with an illustrative embodiment. Service space control process 500 may be an example of one implementation of service space control process 440 in FIG. 4.

Service space control process 500 may include electronic latching process 502, personnel authentication process 504, access control process 506, and modular configuration process 508. Service space control process 500 may receive input 510 from a user interface, such as user interface 438 in FIG. 4. Service space control process 500 may generate number of commands 514 in response to input 510 using electronic latching process 502, personnel authentication process 504, access control process 506, and modular configuration process 508.

Electronic latching process 502 may control an electronic latching system, such as electronic latching system 422 in FIG. 4. Electronic latching process 502 may send commands to an electronic latching system to electronically secure a number of modules after insertion into a customizable service space. Electronic latching process 502 may send commands to an electronic latching system to electronically release a number of modules after insertion into a customizable service space.

Personnel authentication process 504 may control access to the components of a customizable service space and/or the data processing system controlling the customizable service space, such as service space control system 406 in FIG. 4, for example.

Access control process 506 may control an access system, such as access system 424 in FIG. 4. Access control process 506 may analyze user input, such as, for example, user identification information, in order to determine whether a particular user is allowed access to a specific module.

Modular configuration process 508 may provide a number of different configuration options for a customizable service space. For example, modular configuration process 508 may present the number of different configuration options to a user over a user interface for selection by the user of a preferred configuration option.

Input 510 may be received from a user interface, such as user interface 438 in FIG. 4. Input 510 may be processed by data analysis process 512 to generate number of commands 514. Data 516 may be received from a customizable service space, such as customizable service space 404 in FIG. 4. In one illustrative example, data 516 may be radio frequency identification tag information detected by radio frequency identification reader 435 in FIG. 4, for example. In this illustrative example, data 516 may be processed by data analysis process 512 using module identification process 518 to identify a number of modules inserted into a customizable service space. Data analysis process 512 may then generate number of messages 520 with the module identification information, for example. The number of messages may be sent to a database, such as service space database 442, for access by a user over user interface 438 in FIG. 4, for example. In another example, the number of messages may be sent as alerts to a user interface, such as user interface 438 in FIG. 4, for example.

The illustration of service space control process 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
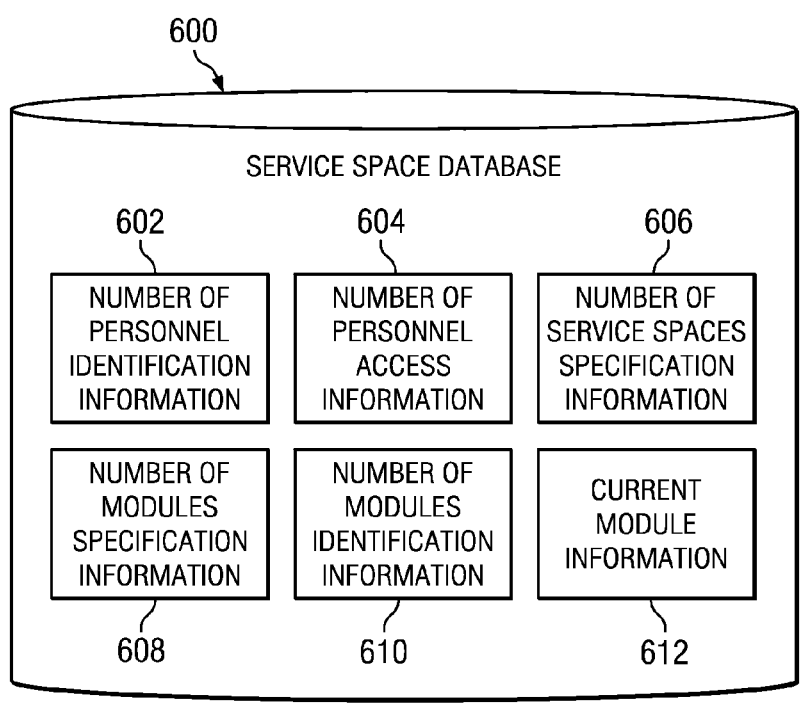
FIG. 6 is an illustration of a service space database in accordance with an illustrative embodiment.

With reference now to FIG. 6, an illustration of a service space database is depicted in accordance with an illustrative embodiment. Service space database 600 may be an example of one illustrative embodiment of service space database 442 in FIG. 4.

Service space database 600 may include number of personnel identification information 602, number of personnel access information 604, number of service spaces specification information 606, number of modules specification information 608, number of modules identification information 610, current module information 612, and/or any other suitable information.

Number of personnel identification information 602 may contain information about the personnel authorized to interact with a service space control system and/or a customizable service space. Information about authorized personnel may include identification information, such as, without limitation, biometric information, facial recognition information, voice recognition information, password and/or pass code associated with a specific individual, name, identifying characteristics, employee data, and/or any other information used to identify an authorized person attempting to access a service space control system. Information contained in number of personnel identification information 602 may be accessed by a process, such as personnel authentication process 504 in FIG. 5, in order to identify and authenticate a person attempting to interact with a service space control system, such as service space control system 406 in FIG. 4, for example.

Number of personnel access information 604 may contain information about the specific modules and/or compartments of a customizable service space that an individual person is authorized to access. Information pertaining to specific modules and/or compartments may be associated with identification information from number of personnel identification information 602. Information contained in number of personnel access information 604 may be used to restrict access to certain modules to a select group of authorized personnel, for example. In an illustrative example, a module used for storage of emergency equipment may be restricted to allow access only to authorized emergency personnel and prohibit access to other personnel.

Number of service spaces specification information 606 may contain information about the technical specification of a number of service spaces. Technical specifications of a service space may include information such as, without limitation, size, width, length, height, weight restrictions, utility configurations, power configurations, and/or any other suitable information about a service space. Number of service spaces specification information 606 may be used by a process, such as modular configuration process 508 in FIG. 5, to generate a number of configuration options for a number of modules in a given service space.

Number of modules specification information 608 may contain information about the technical specifications of a number of modules. Technical specifications of a module may include, without limitation, size, width, length, height, weight, materials, content, utility requirements, power requirements, and/or any other suitable information about a module. Number of modules specification information 608 may be used by a process, such as modular configuration process 508 in FIG. 5, to generate a number of configuration options for a number of modules in a given service space.

Number of modules identification information 610 may contain information used to identify a type of module and/or a specific module. For example, the information may contain, without limitation, the name of a module, the type of module, the purpose of the module, the contents of the module, and/or any other suitable information for identifying a module.

Current module information 612 may contain information received about the current status of a number of modules. Information about the current status of a module may include, without limitation, the location of a module, the age of a module, the time the module has been in its current location, the health of the module, the contents of the module, the last time the module was accessed, and/or any other suitable information about the current status of a module. In one illustrative example, the information about the current status of a module may be received from a service space control system, such as service space control system 406 in FIG. 4, during monitoring of a customizable service space, for example. In another illustrative example, the information about the current status of a module may be received from a radio frequency identification reader, such as radio frequency identification reader 435 in FIG. 4, for example. Information about the current status of a number of modules may be used by personnel interacting with a service space control system to make decisions about reconfiguring a service space, for example, or alert personnel to potential conflicts in a current configuration, in another example.

The illustration of service space database 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7B:
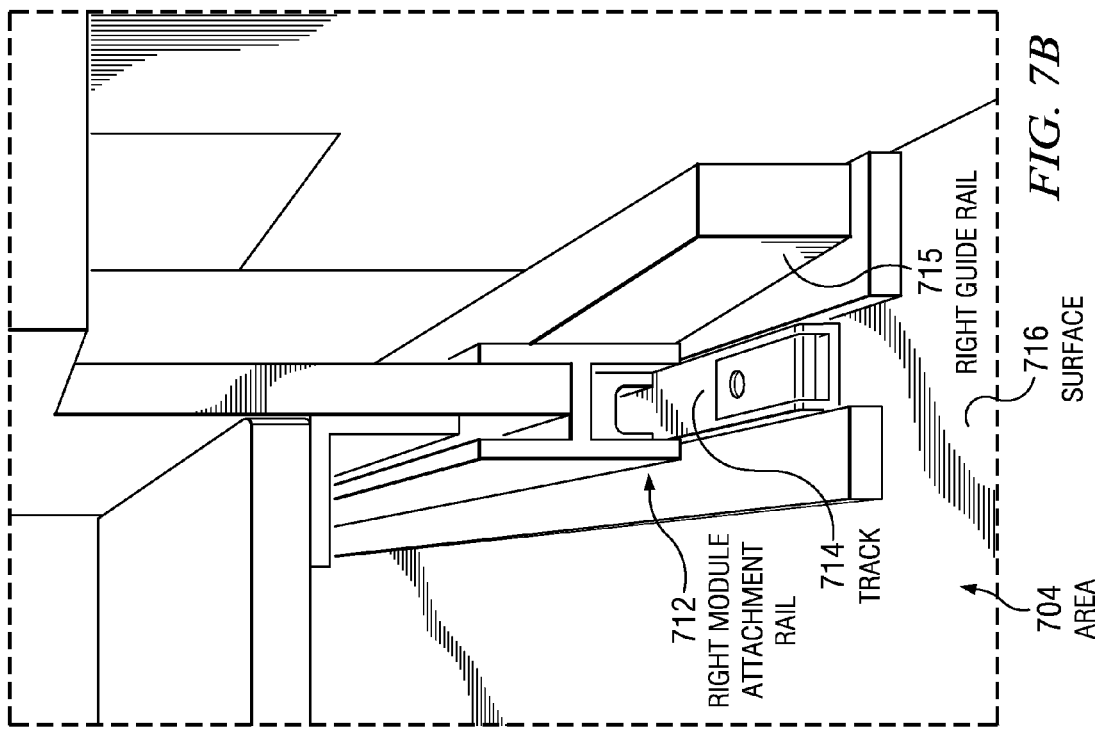
Figure 7A:
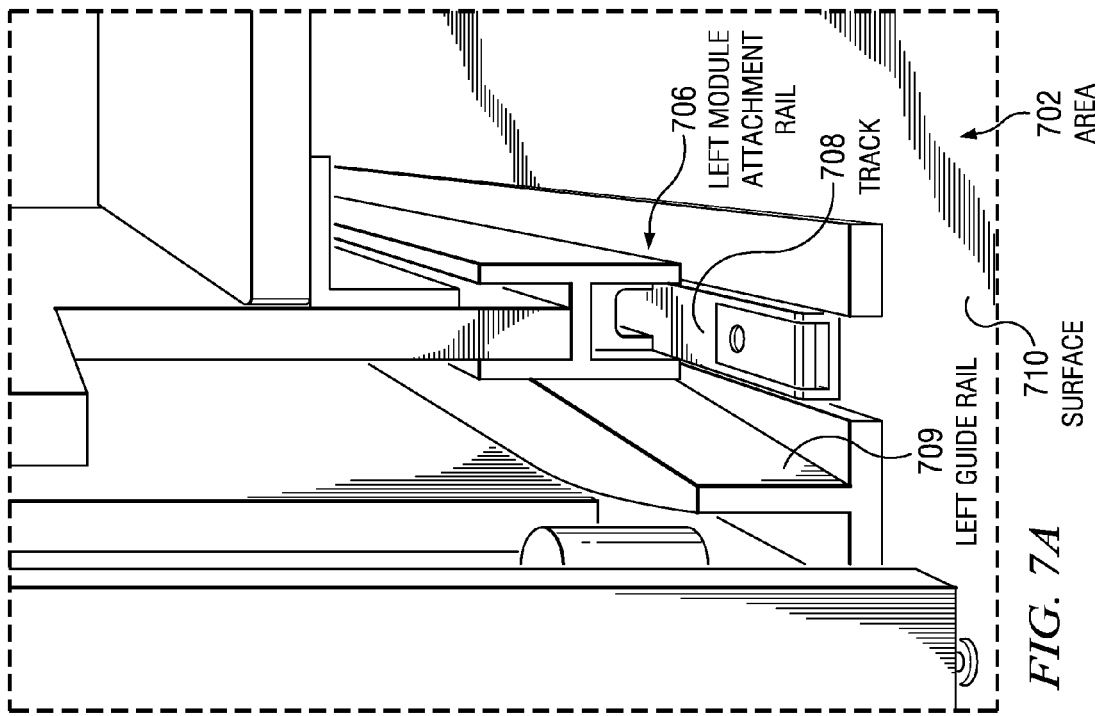

With reference now to FIGS. 7, 7A, and 7B, an illustration of a module is depicted in accordance with an illustrative embodiment. Module 700 may be an example of one implementation of module 430 in FIG. 4.

Module 700 is depicted within customizable service space 701. Module 700 is depicted with area 702 and area 704 in an exploded view in FIGS. 7A and 7B to illustrate the number of rails of module 700 interacting with a track system of a customizable service space, such as track system 418 in customizable service space 404 in FIG. 4.

Area 702 depicts left module attachment rail 706 of module 700. Left module attachment rail 706 is disposed along the bottom surface of module 700 and interacts with track 708. Track 708 is disposed along the floor surface 710 of customizable service space 701.

Similarly, area 704 depicts right module attachment rail 712 of module 700. Right module attachment rail 712 is disposed along the bottom surface of module 700 and interacts with track 714. Track 714 is disposed along the floor surface 716 of customizable service space 701. Track 708 and track 714 may be an example of one implementation of track system 418 in FIG. 4, for example. Track 708 and track 714 provide customizable service space 701 the capability to be configured with any number of different modules, such as module 700.

Left module attachment rail 706 and right module attachment rail 712 may be any type of device capable of interacting with tracks 708 and 714. In one illustrative example, left module attachment rail 706 and right module attachment rail 712 may be slotted rails, and tracks 708 and 714 may include a number of fittings/pins that interact with the rails to grip the rails and assist in secure insertion of module 700 into customizable service space 701. Left guide rail 709 and right guide rail 715 may be any type of rail suitable for aligning module 700 with track 708 and track 714 as module 700 is inserted into customizable service space 701. Left guide rail 709 and right guide rail 715 may be any type of rail suitable for aligning module 700 with track 708 and track 714 as module 700 is inserted into customizable service space 701.

The illustration of module 700 in FIGS. 7, 7A and 7B is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
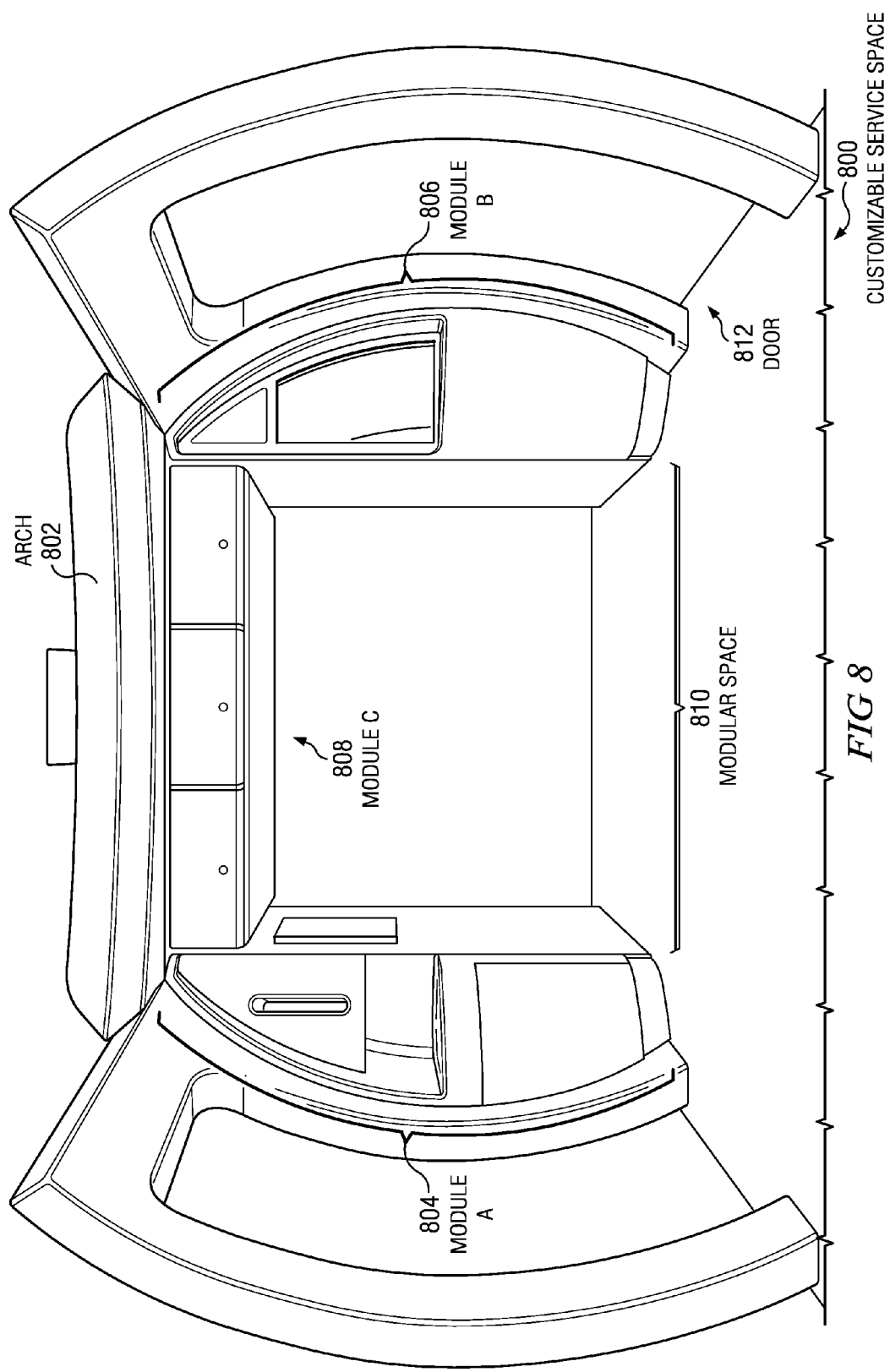
FIG. 8 is an illustration of a customizable service space in accordance with an illustrative embodiment.

With reference now to FIG. 8, an illustration of a customizable service space is depicted in accordance with an illustrative embodiment. Customizable service space 800 may be an example of one implementation of customizable service space 404 in FIG. 4.

Customizable service space 800 may include arch 802. Arch 802 may be an example of one implementation of arch framework 410 in FIG. 4. Arch 802 may be a fixed basic unit that includes distinct spaces for modular components. Arch 802 may include module A 804, module B 806, and module C 808. In one illustrative example, module A 804 and module B 806 may be fixed components of arch 802, while module C 808 may be an optional, or configurable, component of arch 802. Module C 808 may be configurable in size in order to accommodate the size of the vehicle, for example. In an illustrative example of an aircraft, module C 808 may be configured in length between module A 804 and module B 806 to fit the size of the fuselage for which customizable service space 800 has been designed. In another illustrative example, module C 808 may be optionally removed in order to accommodate the specific modules inserted into modular space 810. In this example, modules selected for modular space 810 may have a height that requires the space optionally occupied by module C 808, for example.

In an advantageous embodiment, module A 804 may be a water unit. A water unit may include, for example, a water dispensing component, a filtration system, a faucet, a sink, a container for collecting dispensed water, a drain, a water storage unit, an ice maker, a heating unit, a refrigeration unit, and/or any other suitable water unit component. Module A 804 is configured as a vertical stack. In an illustrative example, module A 804 may provide water for drinking and/or hygiene from the top portion of the vertical stack. Module A 804 may deliver hot and/or cold water to an in-flight station in an aircraft service area for hygiene, such as hand washing by flight attendants for example, from the bottom portion of the vertical stack. Module A 804 may provide filtered drinking water and ice from the same station that provides water for hygiene.

This type of module may reduce the weight and cost of providing bottled drinking water on a flight and reduce the bulk of waste from plastic bottles of water consumed in-flight, for example. A filtered water and ice dispensing system would provide more efficient service and ergonomically friendly preparation. In addition, in an illustrative example, a station for flight attendant hygiene may alleviate the need for flight attendants to share airplane lavatories with passengers. This provides ready access for hand washing to flight attendants at any time, enhancing the health and hygiene of the passengers in turn.

In an advantageous embodiment, module B 806 may be a waste unit. A waste unit may include, for example, a waste storage unit, an access point for inserting waste, an access point for removing waste, a removable bin, and/or any other suitable waste unit component. In an illustrative example, module B 806 may provide storage for trash during transport and operation of a vehicle, such as vehicle 402 in FIG. 4. Module B 806 is configured as a vertical stack.

In an illustrative embodiment, module B 806 may provide high-capacity trash storage that can be accessed at airplane turn time from outside the airplane by the maintenance crew by sliding the trash unit forward into the aft door opening, for example. In another advantageous embodiment, module B 806 may be a storage unit.

In one advantageous embodiment, module C 808 may be overhead storage units. The overhead storage units may include access points, such as doors, for accessing the storage unit and securing the storage unit during transport, for example. Module C 808 may be an optional, or configurable, component of arch 802 that may be inserted or removed dependent upon the number of different modules inserted into modular space 810.

Modular space 810 may be a customizable space within arch 802 of customizable service space 800. In an illustrative example, modular space 810 may be an initial customizable space, although module C 808 may also be customized and/or configured to adapt to the number of modules inserted into modular space 810. Modular space 810 may be implemented with a track system, such as track system 418 of FIG. 4 in order to accept a number of modules, such as number of modules 420 of FIG. 4, into modular space 810.

Door 812 represents an aft door of an aircraft cabin. In an illustrative example, module B 806 may be a waste unit, and may be capable of moving into alignment with door 812 during a service or maintenance process, such as maintenance and service 114 in FIG. 1, for example. Module B 806 may move into alignment with door 812 in order to allow for the removal of waste without requiring maintenance or service personnel to enter the aircraft cabin, for example.

The illustration of customizable service space 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
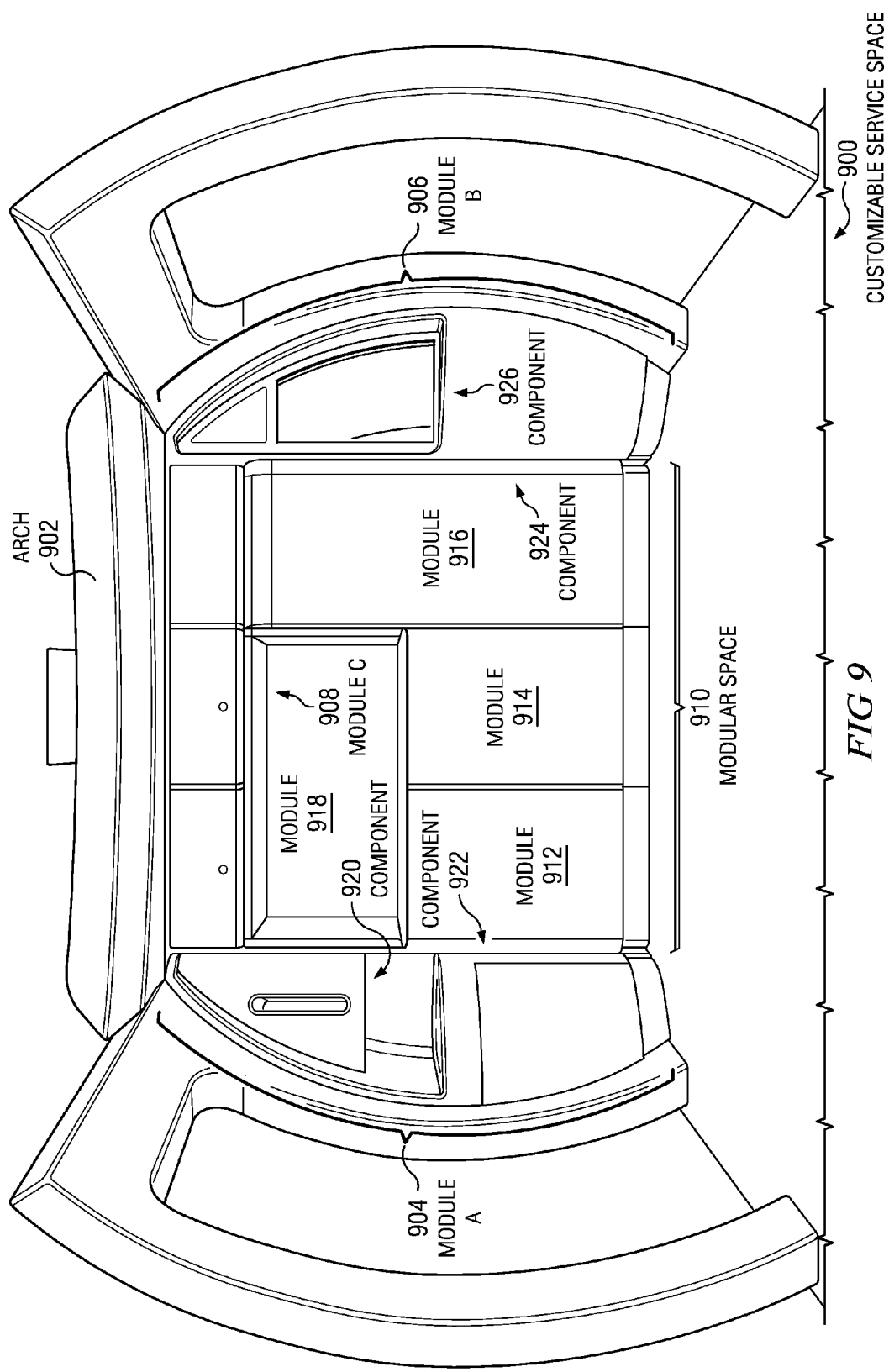
FIG. 9 is an illustration of a customizable service space in accordance with an illustrative embodiment.

With reference now to FIG. 9, an illustration of a customizable service space is depicted in accordance with an illustrative embodiment. Customizable service space 900 may be an example of one implementation of customizable service space 404 in FIG. 4.

Customizable service space 900 may include arch 902. Arch 902 may be an example of one implementation of arch framework 410 in FIG. 4. Arch 902 may include module A 904, module B 906, and module C 908.

In an advantageous embodiment, module A 904 may be a water unit. Module A 904 may include component 920 and component 922. Component 920 may be, for example, a water storage unit and dispensing component. Component 922 may be, for example, a sink, a container for collecting dispensed water, a drain, and/or a water storage unit. In an illustrative example, module A 904 may provide water for drinking and/or hygiene.

In an advantageous embodiment, module B 906 may be a waste unit. Module B 906 may include component 924 and component 926. Component 924 may be, for example, an access point for inserting waste. Component 924 may show an open access point, and may include a door or other suitable covering (not shown) for the open access point, for example. Component 924 may be, for example, a movable component of module B 906 that provides access to an interior waste storage unit, such as a trash bin for example. In an illustrative example, module B 906 may provide storage for trash and component 924 may be a hinged door assembly that may open to provide removal of collected or stored trash.

In one advantageous embodiment, module C 908 may be overhead storage units. The overhead storage units may include access points, such as doors, for accessing the storage unit and securing the storage unit during transport, for example.

Modular space 910 may be a customizable space within arch 902 of customizable service space 900. In an illustrative example, modular space 910 may include module 912, module 914, module 916, and module 918. Modules 912, 914, and 916 may be any type of insertable modules, such as storage units, for example. Module 918 may be a space providing a module capable of providing counter space or flat surface space, for example.

Modular space 910 may be implemented with a track system, such as track system 418 of FIG. 4 in order to accept module 912, module 914, module 916, and module 918 into modular space 910.

The illustration of customizable service space 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
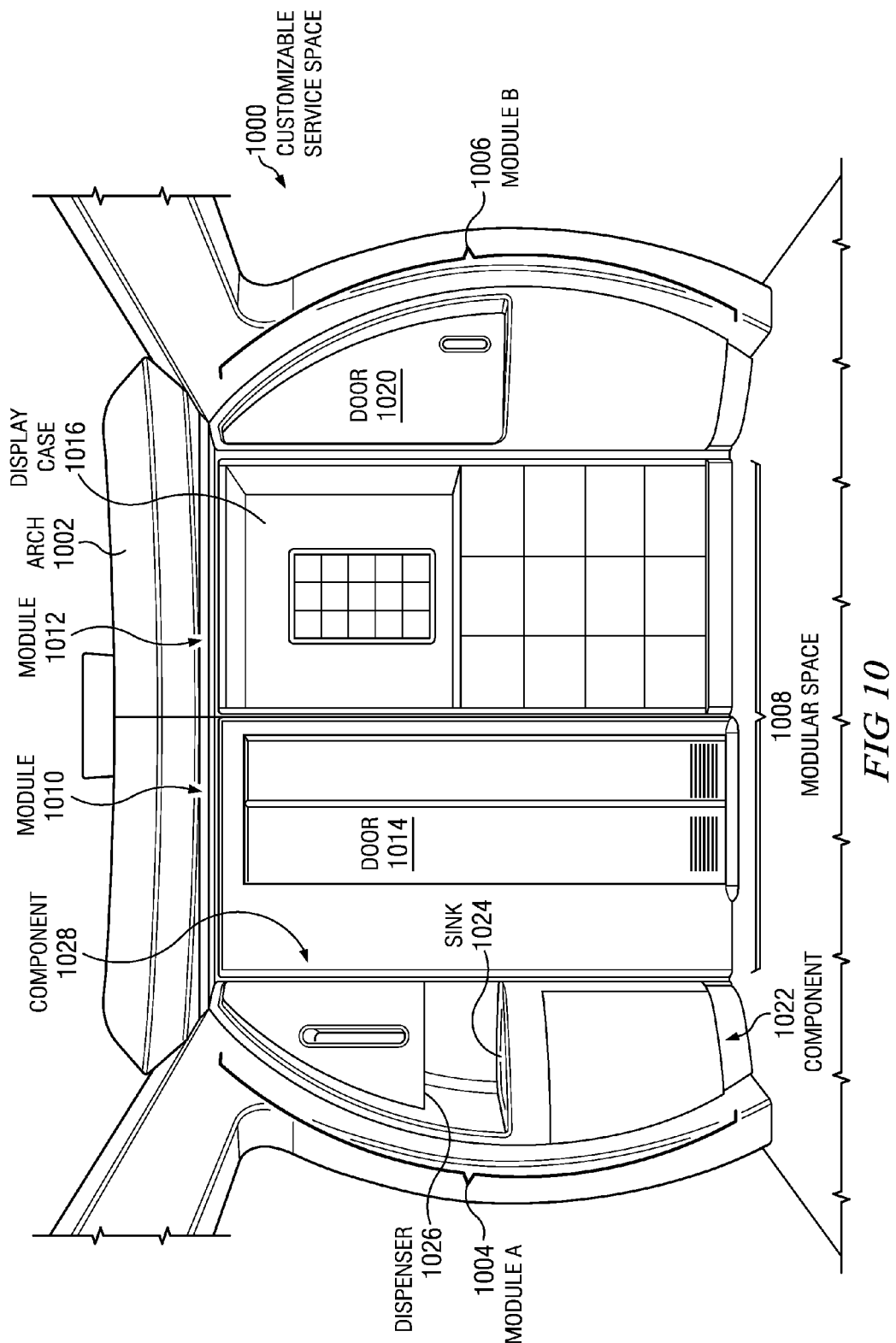
FIG. 10 is an illustration of a customizable service space in accordance with an illustrative embodiment.

With reference now to FIG. 10, an illustration of a customizable service space is depicted in accordance with an illustrative embodiment. Customizable service space 1000 may be an example of one implementation of customizable service space 404 in FIG. 4.

Customizable service space 1000 may include arch 1002. Arch 1002 may be an example of one implementation of arch framework 410 in FIG. 4. Arch 1002 may include module A 1004 and module B 1006. Arch 1002 may provide an illustrative example of a customizable service space configured without module C 908 in FIG. 9, for example.

In an advantageous embodiment, module A 1004 may be a water unit. Module A 1004 may include component 1022, which may be a water storage unit or drain system, in an illustrative example. Module A 1004 may also include sink 1024 and dispenser 1026. Component 1028 may be provided in module A 1004 to provide a view into a water storage unit or water dispensing unit of module A 1004, for example. Component 1028 may be used to monitor a remaining water level, for example.

In an advantageous embodiment, module B 1006 may be a waste unit. Module B 1006 may illustrate a waste unit, such as module B 906 in FIG. 9, with a closed access point, such as door 1020.

Modular space 1008 may be a customizable space within arch 1002 of customizable service space 1000. In an illustrative example, modular space 1008 may include module 1010 and module 1012. Modules 1010 and 1012 may be any type of insertable modules. Module 1010 may be a lavatory module, with door 1014 for access to the lavatory, for example. Module 1012 may be a retail space that includes display case 1016, for example. A retail space may be used for additional revenue opportunities by a company providing transport. For example, a retail space could be leased out to different companies for a specific period of time. In another example, a retail space could be used by the company providing the transportation vehicle to display promotional items. The retail space may be a self-service retail unit and/or a display unit presenting items for purchase during in-flight service, for example.

Modular space 1008 may be implemented with a track system, such as track system 418 of FIG. 4 in order to accept module 1010 and module 1012 into modular space 1008.

The illustration of customizable service space 1000 in FIG. 10 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, modular space 1008 may be configured with a fixed or mobile bar unit (not shown) to serve specialized drinks. The bar unit may be configured to serve specific drinks depending upon the culture of the primary transportation customer. For example, the bar unit may be configured as a tea service, as a full-service bar with alcoholic beverages, as a coffee bar, and/or any other customized drink service configuration.

Figure 11:
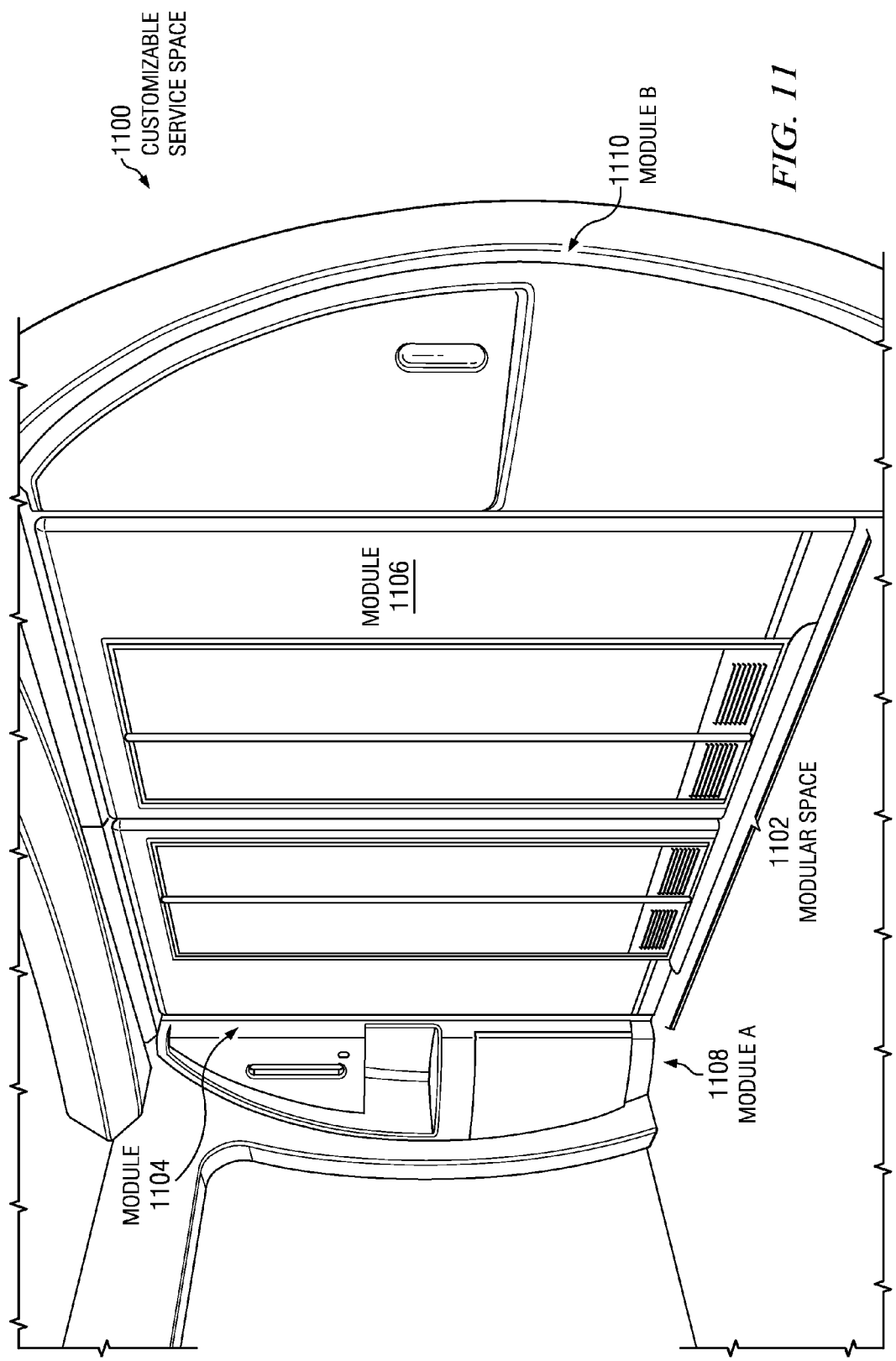
FIG. 11 is an illustration of a customizable service space in accordance with an illustrative embodiment.

With reference now to FIG. 11, an illustration of a customizable service space is depicted in accordance with an illustrative embodiment. Customizable service space 1100 is an example of one implementation of customizable service space 404 in FIG. 4.

Customizable service space 1100 may include modular space 1102. Modular space 1102 may be configured with module 1104 and module 1106. Modules 1104 and 1106 may be, for example, lavatory modules. Modules 1104 and 1106 may be inserted between module A 1108 and module B 1110. Module A 1108 and module B 1110 may be examples of module A 804 and module B 806 in FIG. 8, for example.

The illustration of customizable service space 1100 in FIG. 11 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 12:
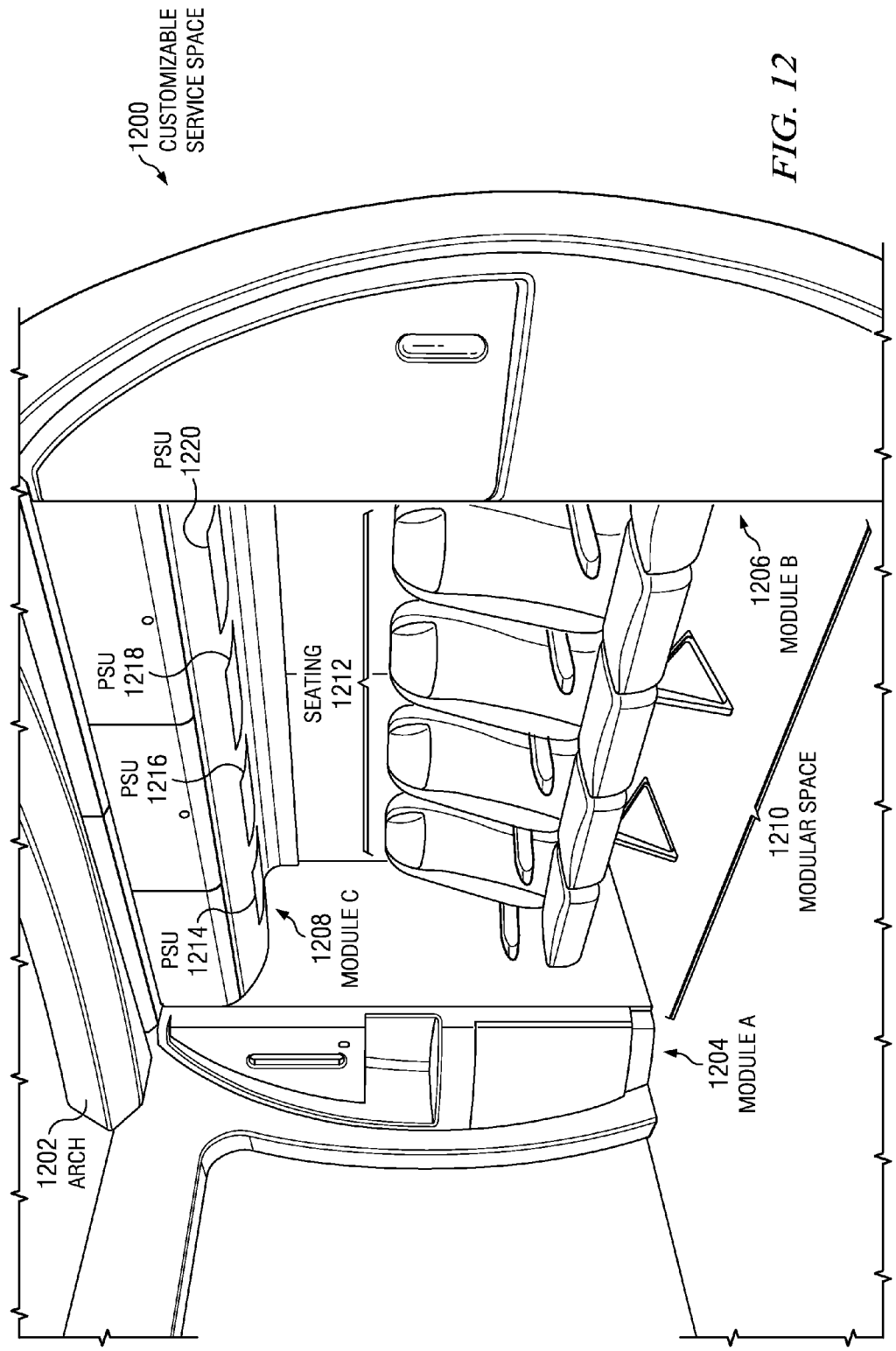
FIG. 12 is an illustration of a customizable service space in accordance with an illustrative embodiment.

With reference now to FIG. 12, an illustration of a customizable service space is depicted in accordance with an illustrative embodiment. Customizable service space 1200 may be an example of one implementation of customizable service space 404 in FIG. 4.

Customizable service space 1200 may include arch 1202. Arch 1202 may be an example of one implementation of arch framework 410 in FIG. 4. Arch 1202 may include module A 1204, module B 1206, and module C 1208.

Module A 1204 is an example of one implementation of module A 804 in FIG. 8. Module B 1206 may be an example of one implementation of module B 806 in FIG. 8. Module C 1208 may be an example of one implementation of module C 808 in FIG. 8.

Modular space 1210 may be a customizable space within arch 1202 of customizable service space 1200. In an illustrative example, modular space 1210 may include seating 1212. Seating 1212 may be provided as additional seating for a vehicle, such as vehicle 402 in FIG. 4, for example. In an illustrative example, seating 1212 may be additional seating for passengers, seating for flight attendants, seating for service crews, seating for transportation crews, specialized seating for persons with disabilities, premier seating, task specific seating, and/or any other suitable type of seating.

In one advantageous embodiment, modular space 1210 may be configured with a person with disabilities module. A person with disabilities module may include additional securing mechanisms for specialized seating, such as a wheelchair or motorized chair for example. Securing mechanisms may include retractable lock down devices and drawer slides that support and guide either a one-piece seating module and/or a wheelchair mounting device to the module, for example. In an illustrative embodiment, an additional locking device may be disposed along the back of the person with disabilities module to hold the wheelchair in place until it is released by crew members on the ground.

Configuration of customizable service space 1200 at the aft end of an aircraft with a person with disabilities module, for example, may provide specialized seating for a person in a wheelchair that enables the person to enter the aircraft through the aft door and move directly to the specialized seating without having to be carried down the aisle to a seat by a special service crew. Existing aircraft aisles can not accommodate a wheelchair and a person with a disability is usually required to sit in an aircraft seat while their wheelchair is stowed during flight. Modular space 1210 may be configured to provide wheelchair seating, allowing persons with disabilities to remain in their own chairs and easily access their seating on the aircraft. The person with disabilities module may be quickly installed during aircraft turn time in response to a passenger need on an upcoming flight, for example. Likewise, the module may be easily removed and replaced with another module when there is no passenger necessity requiring the person with disabilities module.

In one advantageous embodiment, where seating 1212 is inserted into modular space 1210, additional passenger service units may be added to the bottom of module C 1208, such as passenger service units 1214, 1216, 1218, and 1220. Passenger service units may refer to, for example, without limitation, oxygen masks, air vents, emergency lights, attendant call buttons, and/or any other suitable passenger service unit. If any type of seating is provided in modular space 1210, passenger service units may be dispersed along the underside of module C 1208. In an advantageous embodiment where a type of seating is provided and module C 1208 is removed from the configuration, such as in the business center example of FIG. 13, passenger service units may be dispersed along the underside of arch 1202.

The illustration of customizable service space 1200 in FIG. 12 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 13:
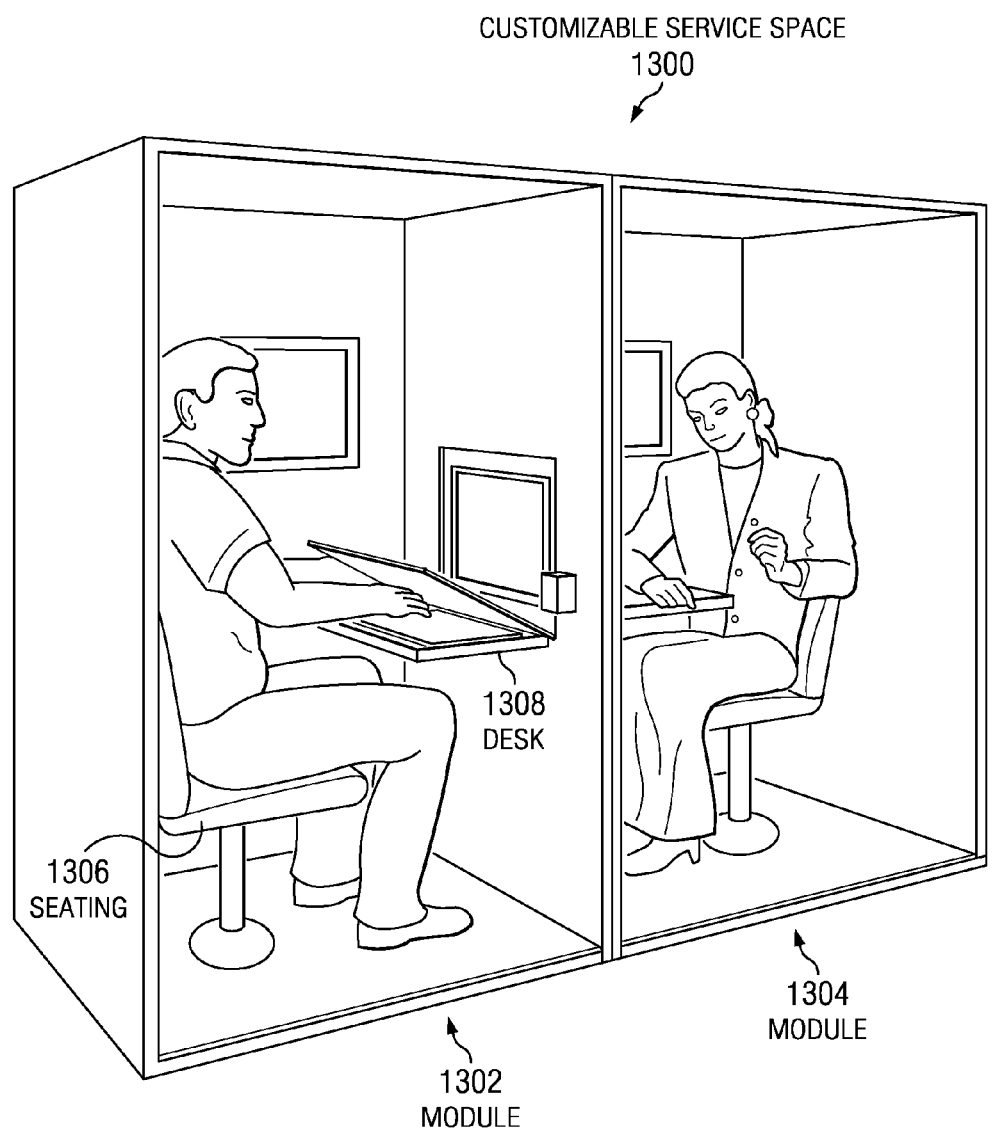
FIG. 13 is an illustration of a customizable service space in accordance with an illustrative embodiment.

With reference now to FIG. 13, an illustration of a customizable service space is depicted in accordance with an illustrative embodiment. Customizable service space 1300 is an example of one implementation of customizable service space 404 in FIG. 4.

Customizable service space 1300 may include module 1302 and module 1304. Module 1302 may be a business center or work place implemented within a vehicle, such as vehicle 402 in FIG. 4. Module 1302 may include seating 1306 and desk 1308, for example. Module 1302 and module 1304 may be configured with any number of components to provide a mobile working environment, for example.

The illustration of customizable service space 1300 in FIG. 13 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 14:
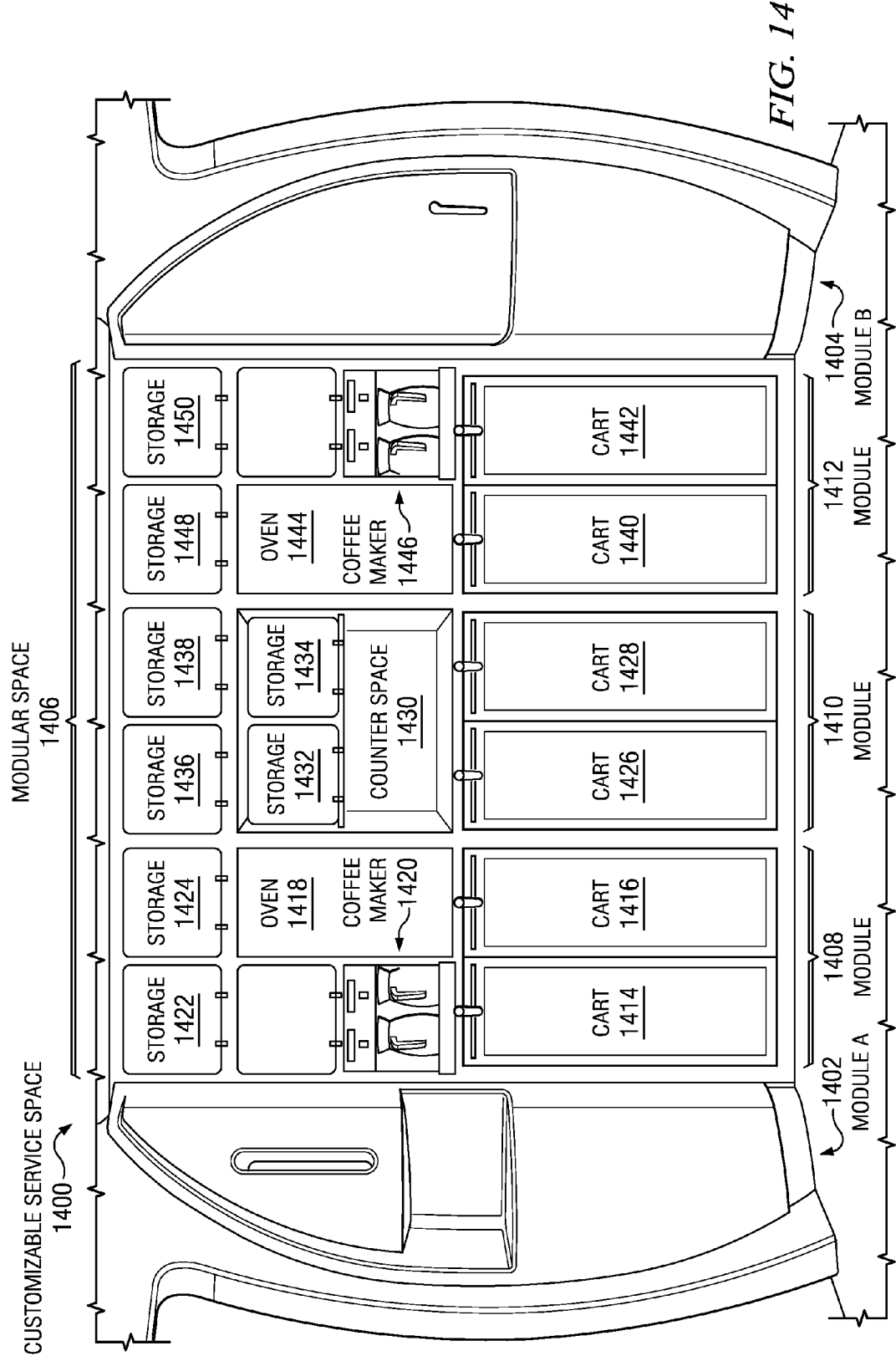
FIG. 14 is an illustration of a customizable service space in accordance with an illustrative embodiment.

With reference now to FIG. 14, an illustration of a customizable service space is depicted in accordance with an illustrative embodiment. Customizable service space 1400 is an example of one implementation of customizable service space 404 in FIG. 4.

Customizable service space 1400 may include module A 1402, module B 1404, and modular space 1406. Module A 1402 may be an example of one implementation of module A 804 in FIG. 8. Module B 1404 may be an example of one implementation of module B 806 in FIG. 8. Modular space 1406 may be an example of one implementation of modular space 810 in FIG. 8.

Modular space 1406 may include module 1408, module 1410, and module 1412. Module 1408, module 1410, and module 1412 may be an example of one implementation of number of modules 420 in FIG. 4, for example. Module 1408, module 1410, and module 1412 may include modules specific to a galley service space, for example. Module 1408 may include cart 1414 and cart 1416, oven 1418, coffee maker 1420, storage 1422, and storage 1424.

Module 1410 may include cart 1426, cart 1428, counter space 1430, storage 1432, storage 1434, storage 1436, and storage 1438. Module 1412 may include cart 1440, cart 1442, oven 1444, coffee maker 1446, storage 1448, and storage 1450.

The illustration of customizable service space 1400 in FIG. 14 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 15:
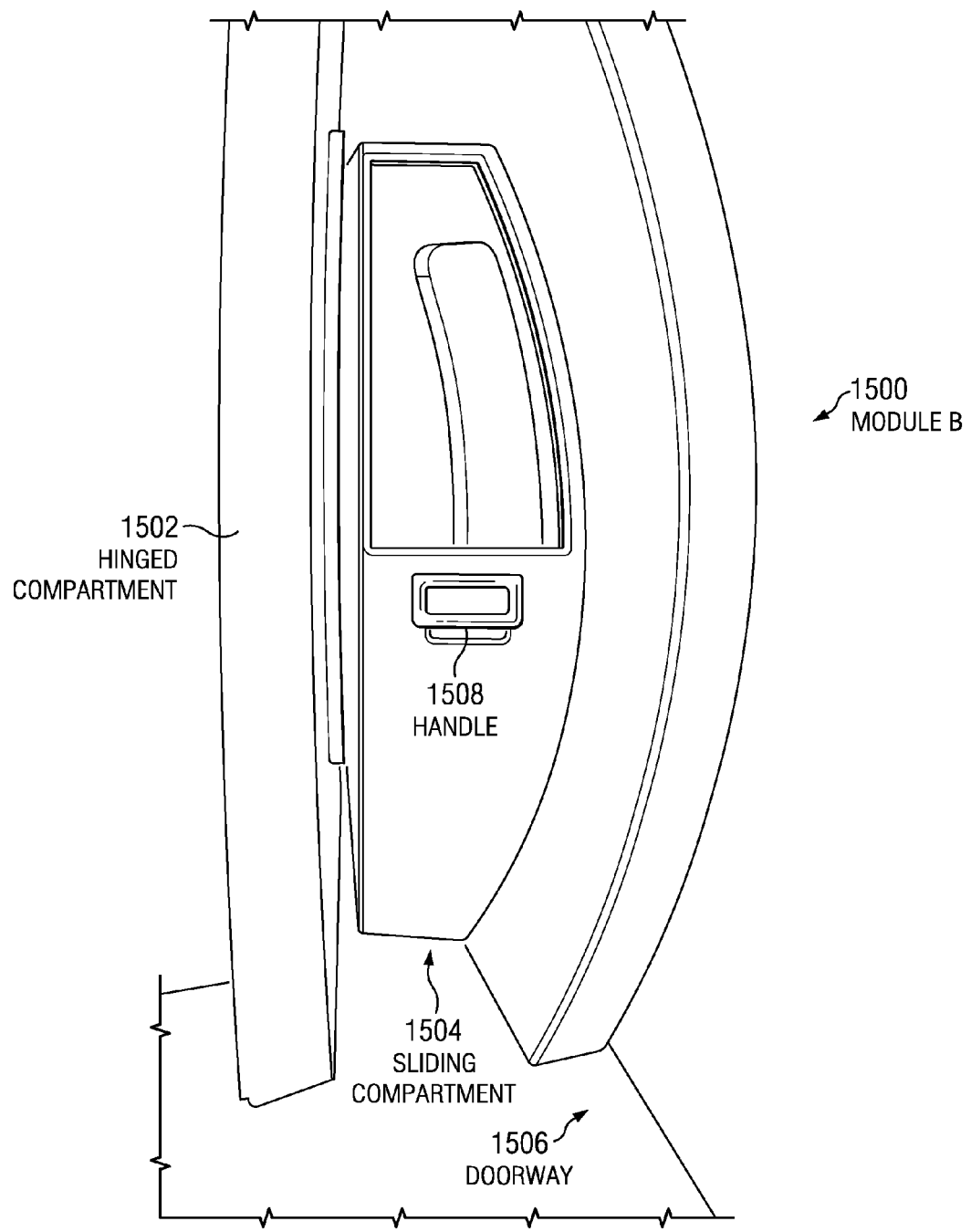
FIG. 15 is an illustration of a module in a customizable service space in accordance with an illustrative embodiment.

With reference now to FIG. 15, an illustration of a module in a customizable service space is depicted in accordance with an illustrative embodiment. Module B 1500 is an example of one implementation of module B 806 in FIG. 8.

Module B 1500 may be an illustrative example of a movable waste unit. Module B 1500 includes hinged compartment 1502 and sliding compartment 1504. Hinged compartment 1502 may be a movable portion of module B 1500 that provides access to sliding compartment 1504 and secures sliding compartment 1504 during transport. In one advantageous embodiment, sliding compartment 1504 may be a waste storage unit. Sliding compartment 1504 may be composed of a water tight, durable material, such as blow molded or rotor-molded plastic, for example. Sliding compartment 1504 may accommodate trash and recyclable material, or the storage of all purpose trash bags that can be separated for recycling off the vehicle, for example. Sliding compartment 1504 may include handle 1508 for pulling sliding compartment 1504 into alignment with doorway 1506. Alignment of sliding compartment 1504 with doorway 1506 may provide for removal of stored waste, such as trash or recyclable materials, by personnel outside the vehicle without requiring entrance into the vehicle, for example. In an illustrative example, sliding compartment 1504 may be completely removable from module B 1500 for cleaning and sanitation during vehicle turn time.

Sliding compartment 1504 may include retractable drawer slides on the bottom surface of sliding compartment 1504. The retractable drawer slides may support and guide sliding compartment 1504 into and out of module B 1500. This sliding system may allow for quick and easy removal of waste collected on a vehicle during transport, for example.

The illustration of module B 1500 in FIG. 15 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 16:
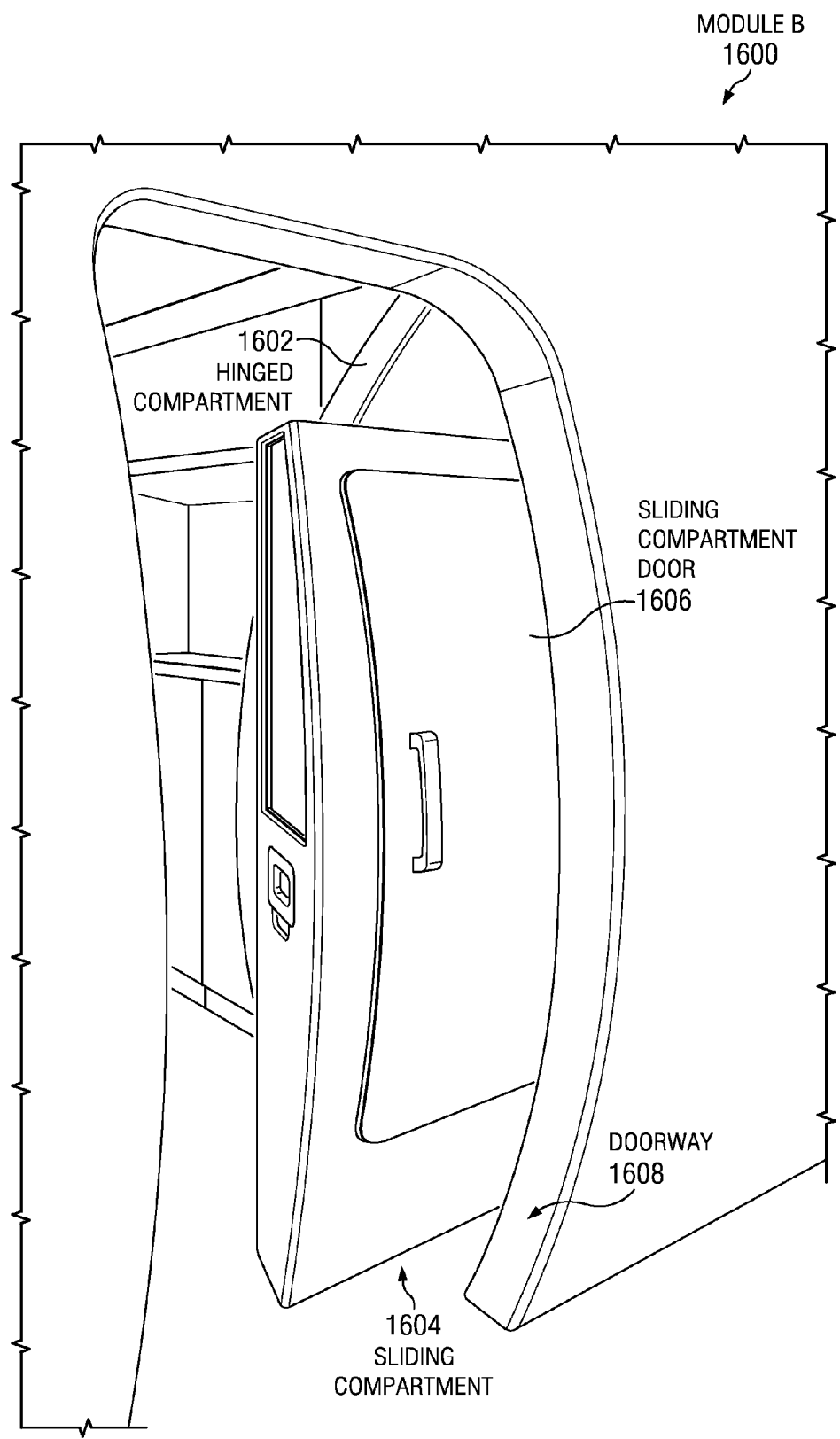
FIG. 16 is an illustration of a module in a customizable service space in accordance with an illustrative embodiment.

With reference now to FIG. 16, an illustration of a module in a customizable service space is depicted in accordance with an illustrative embodiment. Module B 1600 is an example of one implementation of module B 806 in FIG. 8.

Module B 1600 may be an illustrative example of a movable waste unit. Module B 1600 depicts module B 1500 in FIG. 15 partially aligned with doorway 1608. Module B 1600 includes hinged compartment 1602 and sliding compartment 1604. Sliding compartment 1604 may be a waste storage unit. Sliding compartment 1604 may include sliding compartment door 1606 for accessing the interior of sliding compartment 1604. Alignment of sliding compartment 1604 with doorway 1608 may provide for access to sliding compartment 1604 without requiring personnel entrance into the vehicle, for example.

The illustration of module B 1600 in FIG. 16 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 17:
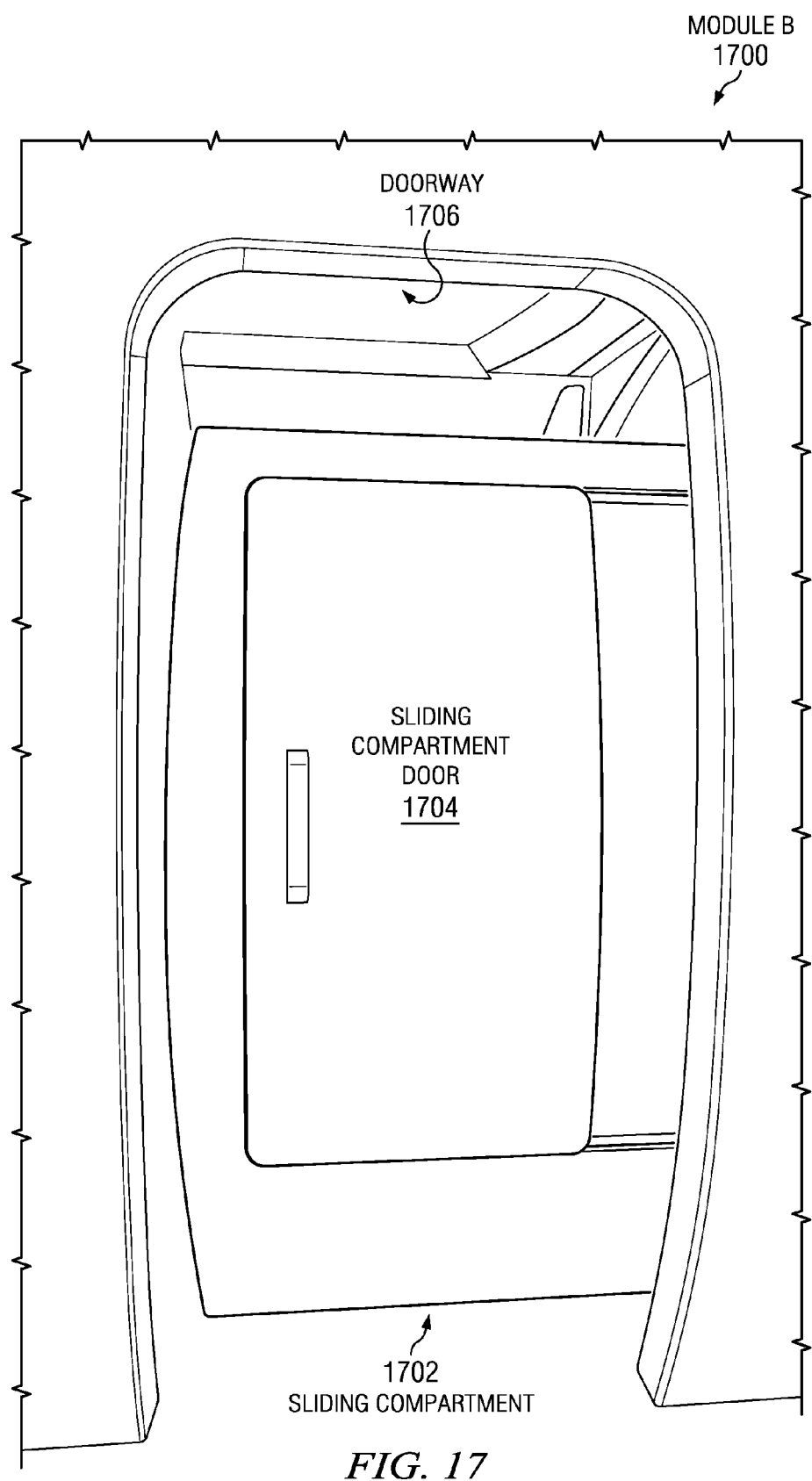
FIG. 17 is an illustration of a module in a customizable service space in accordance with an illustrative embodiment.

With reference now to FIG. 17, an illustration of a module in a customizable service space is depicted in accordance with an illustrative embodiment. Module B 1700 is an example of one implementation of module B 806 in FIG. 8.

Module B 1700 depicts module B 1500 in FIG. 15 fully aligned with doorway 1706. Sliding compartment 1702 may include sliding compartment door 1704 for accessing the interior of sliding compartment 1702. Alignment of sliding compartment 1702 with doorway 1706 may provide for access to sliding compartment 1702 without requiring personnel entrance into the vehicle, for example.

The illustration of module B 1700 in FIG. 17 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 18:
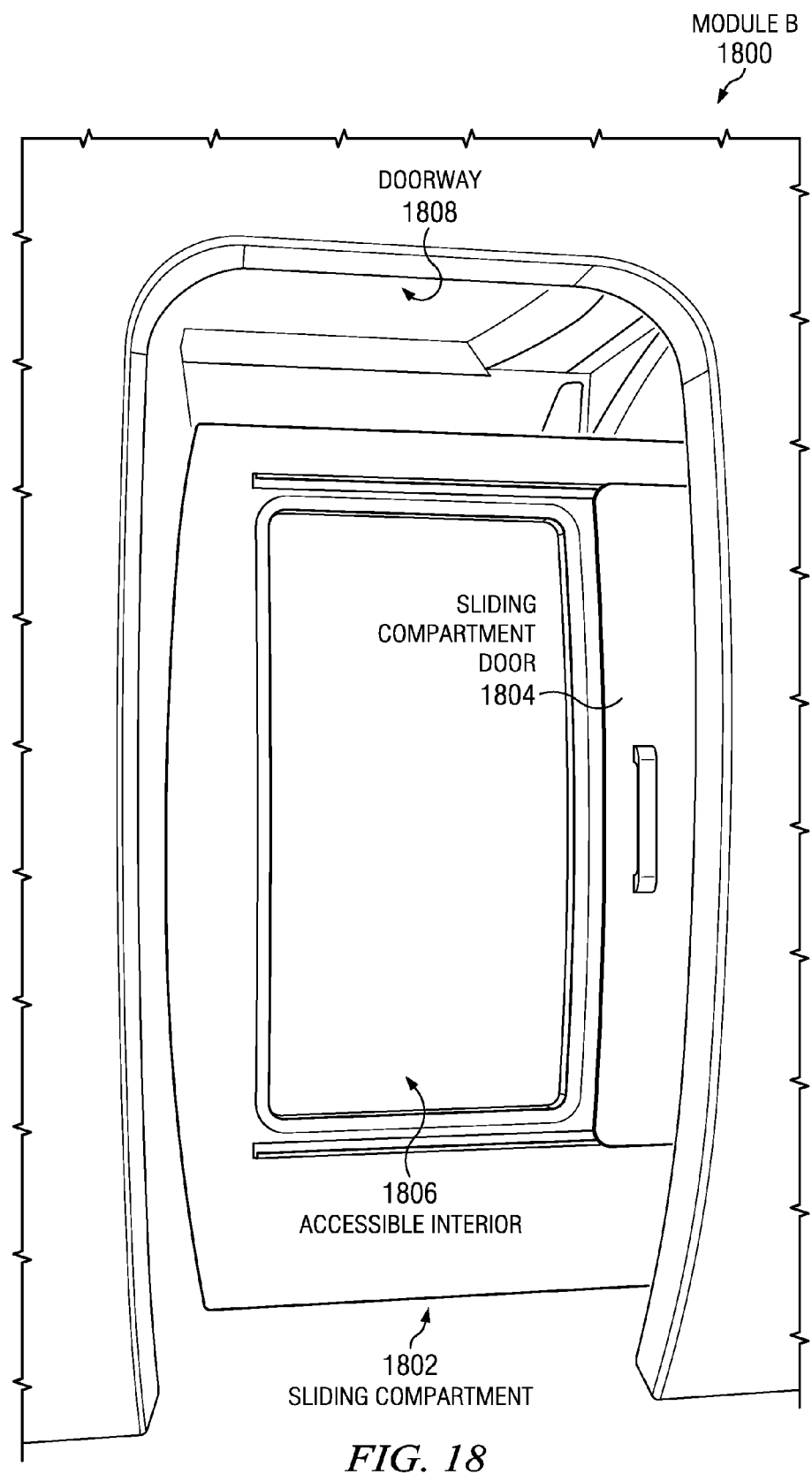
FIG. 18 is an illustration of a module in a customizable service space in accordance with an illustrative embodiment.

With reference now to FIG. 18, an illustration of a module in a customizable service space is depicted in accordance with an illustrative embodiment. Module B 1800 is an example of one implementation of module B 806 in FIG. 8.

Module B 1800 depicts sliding compartment 1802 fully aligned with doorway 1808 and having sliding compartment door 1804 in an open position, allowing access to accessible interior 1806 of sliding compartment 1802.

The illustration of module B 1800 in FIG. 18 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 19:
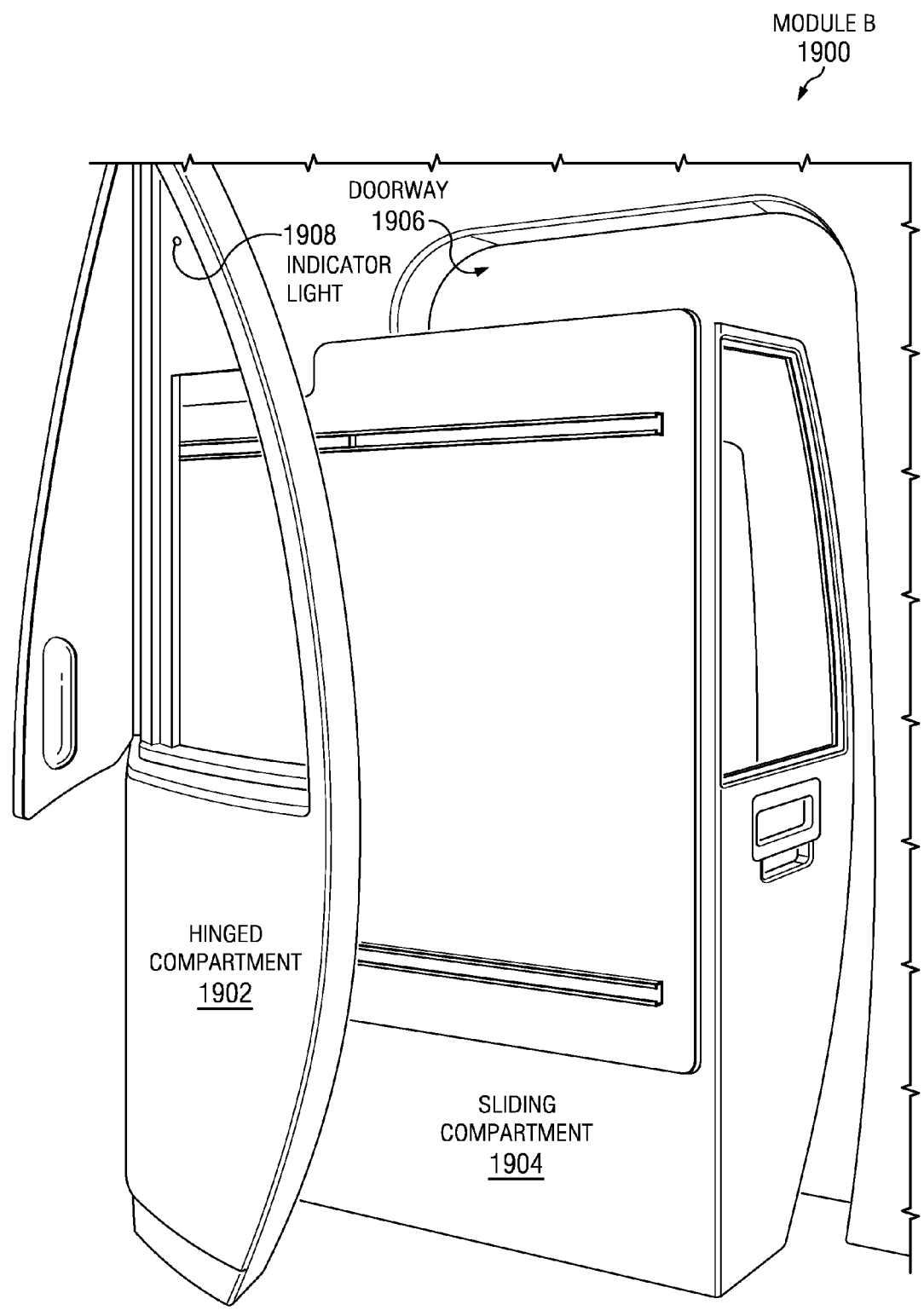
FIG. 19 is an illustration of a module in a customizable service space in accordance with an illustrative embodiment.

With reference now to FIG. 19, an illustration of a module in a customizable service space is depicted in accordance with an illustrative embodiment. Module B 1900 is an example of one implementation of module B 806 in FIG. 8.

Module B 1900 depicts sliding compartment 1904 as viewed from the interior of a vehicle, such as vehicle 402 in FIG. 4. Sliding compartment 1904 is depicted as fully aligned with doorway 1906. Hinged compartment 1902 is in an open position, allowing for movement of sliding compartment 1904. Indicator light 1908 may be included on module B 1900. Indicator light 1908 may be, for example, without limitation, a light-emitting diode (LED) light. In an illustrative example, indicator light 1908 may light up when sliding compartment 1904 is not locked in place. When sliding compartment 1904 is installed and locked in place, indicator light 1908 may turn off. Indicator light 1908 may serve as a visual indication to ensure that sliding compartment 1904 is locked in place prior to vehicle movement, such as an airplane taking off for flight for example.

The illustration of module B 1900 in FIG. 19 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 20:
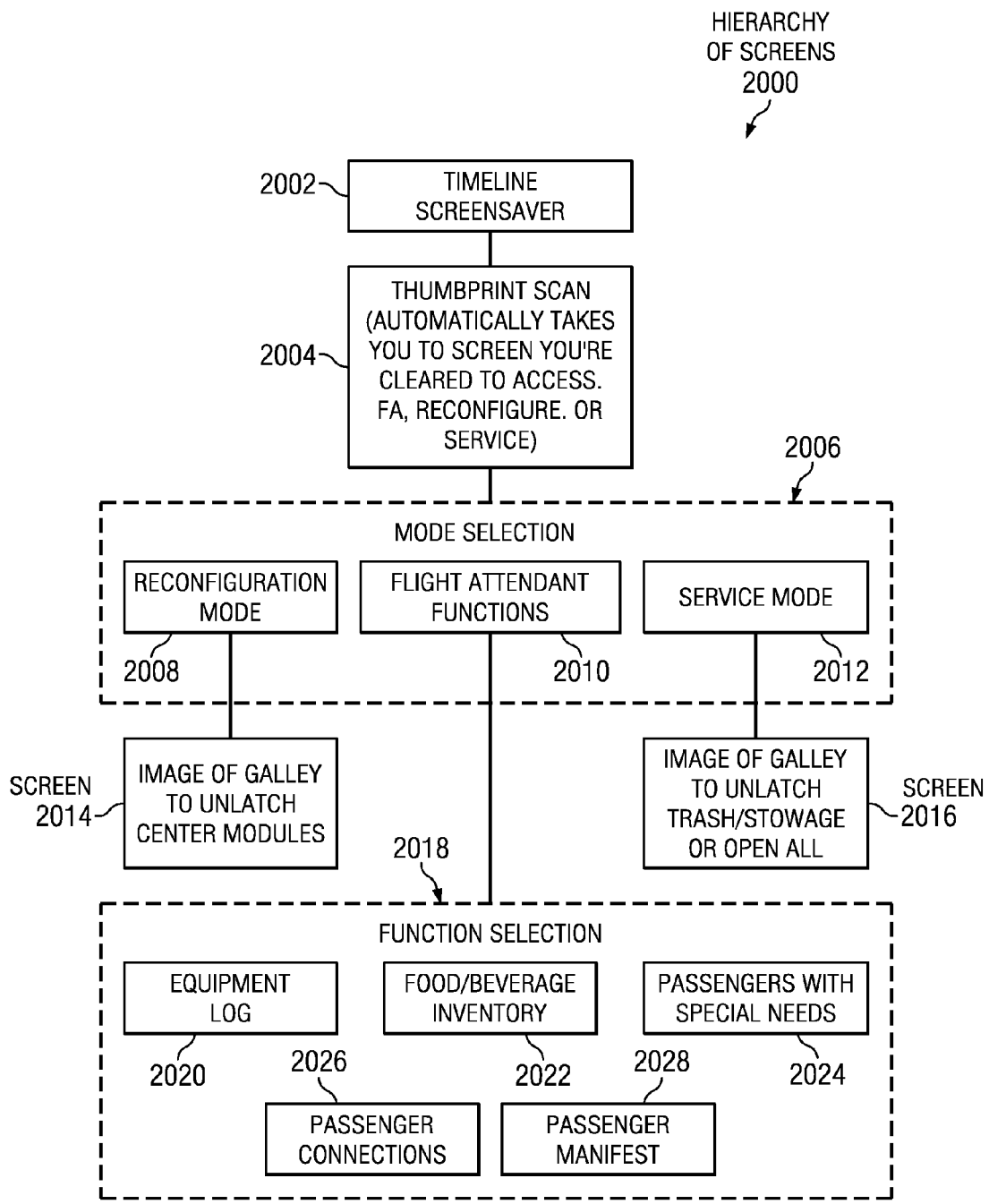
FIG. 20 is an illustration of a hierarchy of screens in accordance with an illustrative embodiment.

With reference now to FIG. 20, an illustration of a hierarchy of screens is depicted in accordance with an illustrative embodiment. Hierarchy of screens 2000 may be an example of different functionalities of service space control system 406 presented on user interface 438 in FIG. 4.

Hierarchy of screens 2000 may begin with timeline screensaver 2002. Timeline screensaver 2002 may be, for example, an image displayed when the display device is idle. The display device may be a touch screen panel, a handheld device, a computer monitor with keyboard and mouse peripherals, and/or any other suitable display device.

The user interface may be activated by user input, such as detection of the presence and location of a touch within the display area for example. Upon activation, the user interface may display thumbprint scan 2004. Thumbprint scan 2004 may be capable of biometric scanning for information and security. Upon identification using biometric information, the user interface will display the appropriate screen or screen selection options in mode selection 2006 based on clearance and/or authorized access. For example, if a maintenance or service worker authorized to reconfigure and service a customizable service space activates the user interface, the next screen presented may be mode selection 2006 showing options reconfiguration mode 2008 and service mode 2012. The authorized maintenance or service worker may then select which mode will be employed for the current operation. In another illustrative example, if a flight attendant activates the user interface, the next screen presented may be flight attendant functions 2010. The options presented in hierarchy of screens 2000 are provided for illustrative purposes. Any number of different mode selection options and screen options may be presented in a service space control system over a user interface.

Mode selection 2006 may further direct a user to functional components of a user interface. For example, reconfiguration mode 2008 may direct a user to screen 2014 displaying an image of a galley to unlatch center modules, such as modules 912, 914, and 916 in modular space 910 of FIG. 9, for example. Screen 2014 may provide an image of a customizable service space complete with the current configuration of modules. The image of the current configuration may allow for selection of individual and/or specific modules for unlatching and removal during reconfiguration, for example.

In another illustrative example, service mode 2012 may direct a user to screen 2016 displaying an image of a galley to unlatch trash and/or stowage or open all modules. Screen 2016 may provide an image of a customizable service space complete with the current configuration of modules, which allows for selection of individual and/or specific modules for providing access to those modules. For example, a user may select module B 806 to access the trash storage bin located within module B 806 in FIG. 8 in order to remove collected trash during airplane turn time.

Flight attendant functions 2010 may direct a user to function selection 2018. Function selection 2018 may provide a number of different functional capabilities of a service space control system for selection by the user. For example, function selection 2018 may include, without limitation, equipment log 2020, food/beverage inventory 2022, passengers with special needs 2024, passenger connections 2026, passenger manifest 2028, and/or any other suitable function selection.

The illustration of hierarchy of screens 2000 in FIG. 20 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 21:
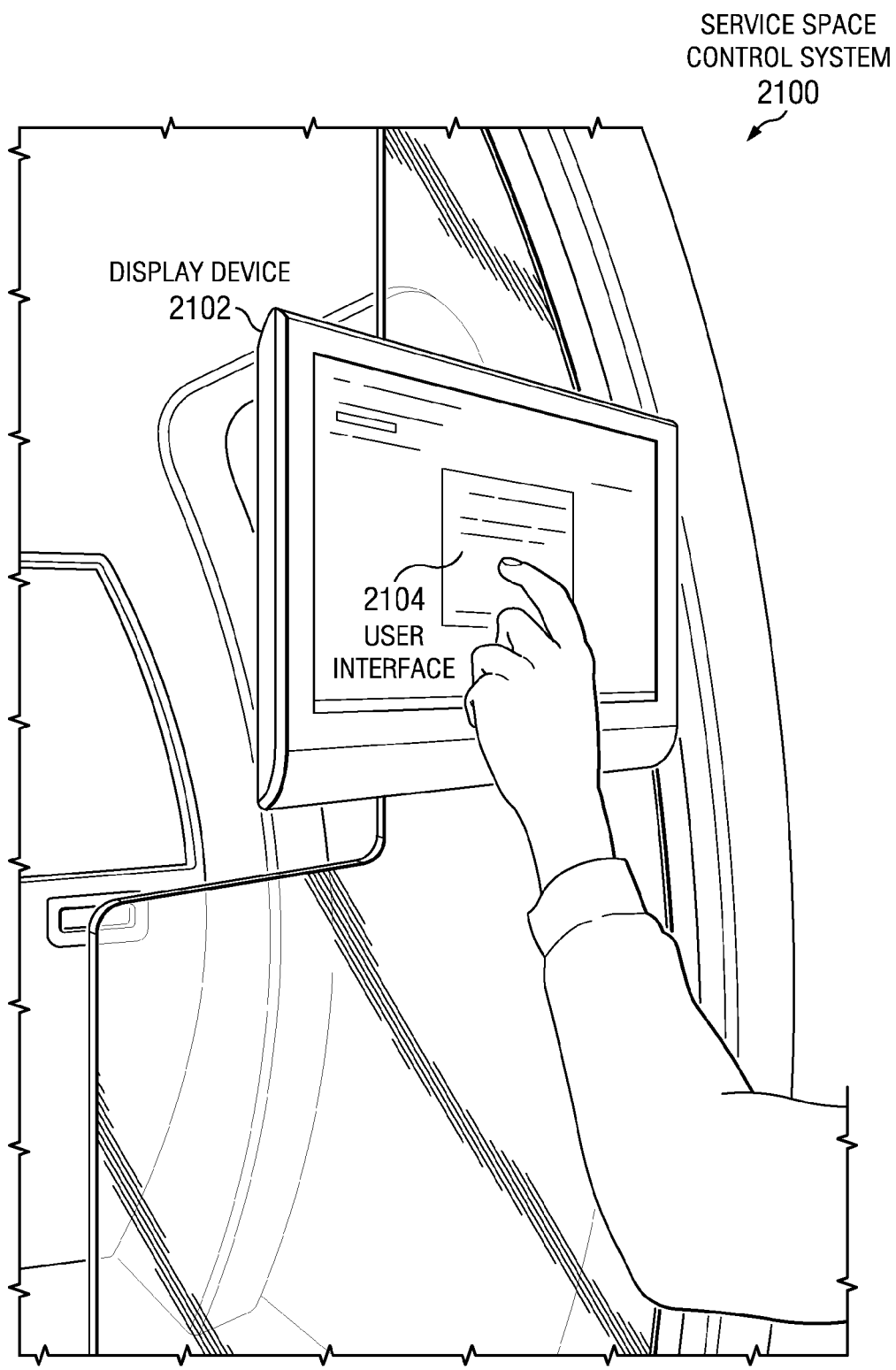
FIG. 21 is an illustration of a service space control system in accordance with an illustrative embodiment.

With reference now to FIG. 21, an illustration of a service space control system is depicted in accordance with an illustrative embodiment. Service space control system 2100 may be an example of one implementation of service space control system 406 in FIG. 4.

Service space control system 2100 may include display device 2102. Display device 2102 may present user interface 2104. User interface 2104 allows a user to interact with service space control system 2100.

Service space control system 2100 provides vehicle personnel access to information, access to modules, and control of a customizable service space. Vehicle personnel may include, for example, without limitation, transportation personnel, service personnel, maintenance personnel, and/or any other suitable personnel. Transportation personnel may be, for example, flight attendants of an aircraft vehicle. Other functionalities that may be provided by service space control system 2100 may include, without limitation, security of storage areas, galley equipment report logs, cabin controls, inventory, revenue tracking connecting information, passenger manifest, information management, and/or any other suitable transportation carrier functionality.

Display device 2102 may be provided as a touch screen panel, a computer monitor with peripheral components such as keyboard and mouse, a handheld computing device, and/or any other suitable display device for presenting user interface 2104. User interface 2104 consolidates information into a single presentation format and provides specific information about the vehicle, customizable service space, modules, passengers, and/or any other suitable information. User interface 2104 provides security and electronic control functions that enable the access and removal of modules in a customizable service space. Security and electronic control functions may be, for example, without limitation, electronic latching process 502, personnel authentication process 504, access control process 506, and modular configuration process 508 of FIG. 5. For example, maintenance personnel can electronically unlatch and release a number of modules from a modular space without the use of tools and/or heavy equipment to quickly and efficiently remove and/or replace individual modules.

The illustration of service space control system 2100 in FIG. 21 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 22:
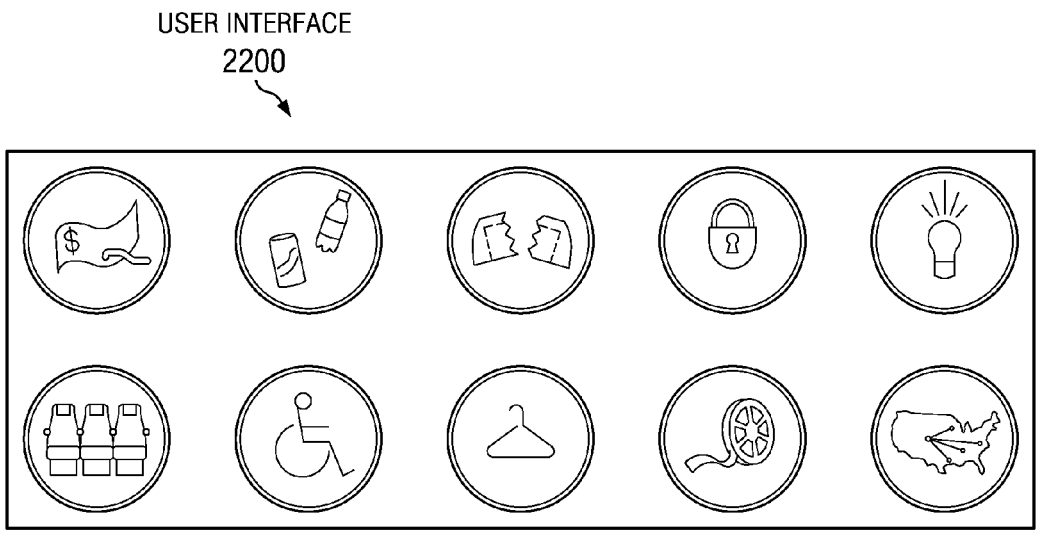
FIG. 22 is an illustration of a user interface in accordance with an illustrative embodiment.

With reference now to FIG. 22, an illustration of a user interface is depicted in accordance with an illustrative embodiment. User interface 2200 may be an example of one implementation of user interface 438 in FIG. 4. User interface 2200 may depict an example of one implementation of timeline screensaver 2002 in FIG. 20.

Figure 23:
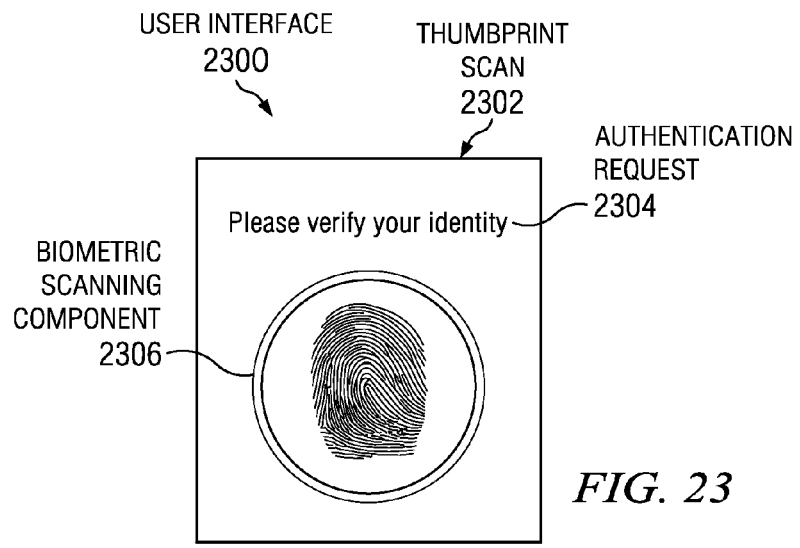
FIG. 23 is an illustration of a user interface in accordance with an illustrative embodiment.

With reference now to FIG. 23, an illustration of a user interface is depicted in accordance with an illustrative embodiment. User interface 2300 may be an example of one implementation of user interface 438 in FIG. 4. User interface 2300 may depict an example of one implementation of thumbprint scan 2004 in FIG. 20.

In an illustrative example, thumbprint scan 2302 may include authentication request 2304 and biometric scanning component 2306. Biometric scanning component 2306 may be any type of biometric scanning device, such as a fingerprint scan, retinal scan, and/or any other suitable type of biometric detection device.

The illustration of user interface 2300 in FIG. 21 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, other forms of authentication and/or user verification may be used in place of or in addition to biometric scanning. In one example, a unique identification code may be used to securely sign on to the service space control system. In another example, an identification badge with a radio frequency identification tag may be detected by the service space control system.

Figure 24:
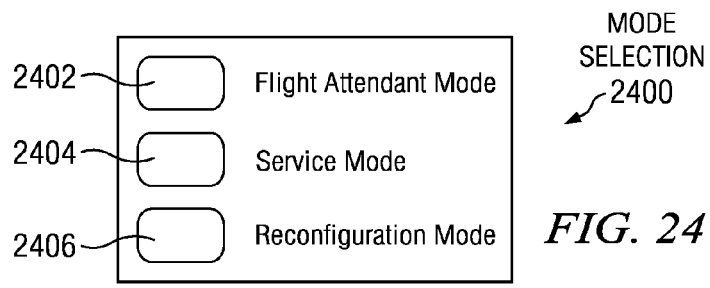
FIG. 24 is an illustration of a mode selection in accordance with an illustrative embodiment.

With reference now to FIG. 24, an illustration of a mode selection is depicted in accordance with an illustrative embodiment. Mode selection 2400 may be an example of one implementation of mode selection 2006 in FIG. 20 over a user interface, such as user interface 438 in FIG. 4.

Mode selection 2400 may include flight attendant mode 2402, service mode 2404, and reconfiguration mode 2406. Flight attendant mode 2402 may direct a user to a number of different flight attendant functions or capabilities, such as passenger list management, food and beverage inventory, identification of passengers with special needs and/or request, identification of passenger connections, equipment logs, and/or any other suitable function. Service mode 2404 may be used by service personnel during vehicle turn time to replenish module contents or empty waste, such as trash collected in module B 806 in FIG. 8, for example. Service mode 2404 may also be used to replace a module, for example an empty food cart module with a full food cart module for the next flight. Reconfiguration mode 2406 may be used by maintenance personnel, for example, to reconfigure a customizable space with a number of new modules.

With reference now to FIG. 25, an illustration of a passenger connections screen is depicted in accordance with an illustrative embodiment. Passenger connections screen 2500 may be an example of a screen presented when passenger connections 2026 in FIG. 20 is selected over a user interface, such as user interface 438 in FIG. 4.

Passenger connections screen 2500 may include information about the number of connecting passengers 2502, status of connecting flights 2504, and other information about connecting passengers and/or flights.

Figure 26:
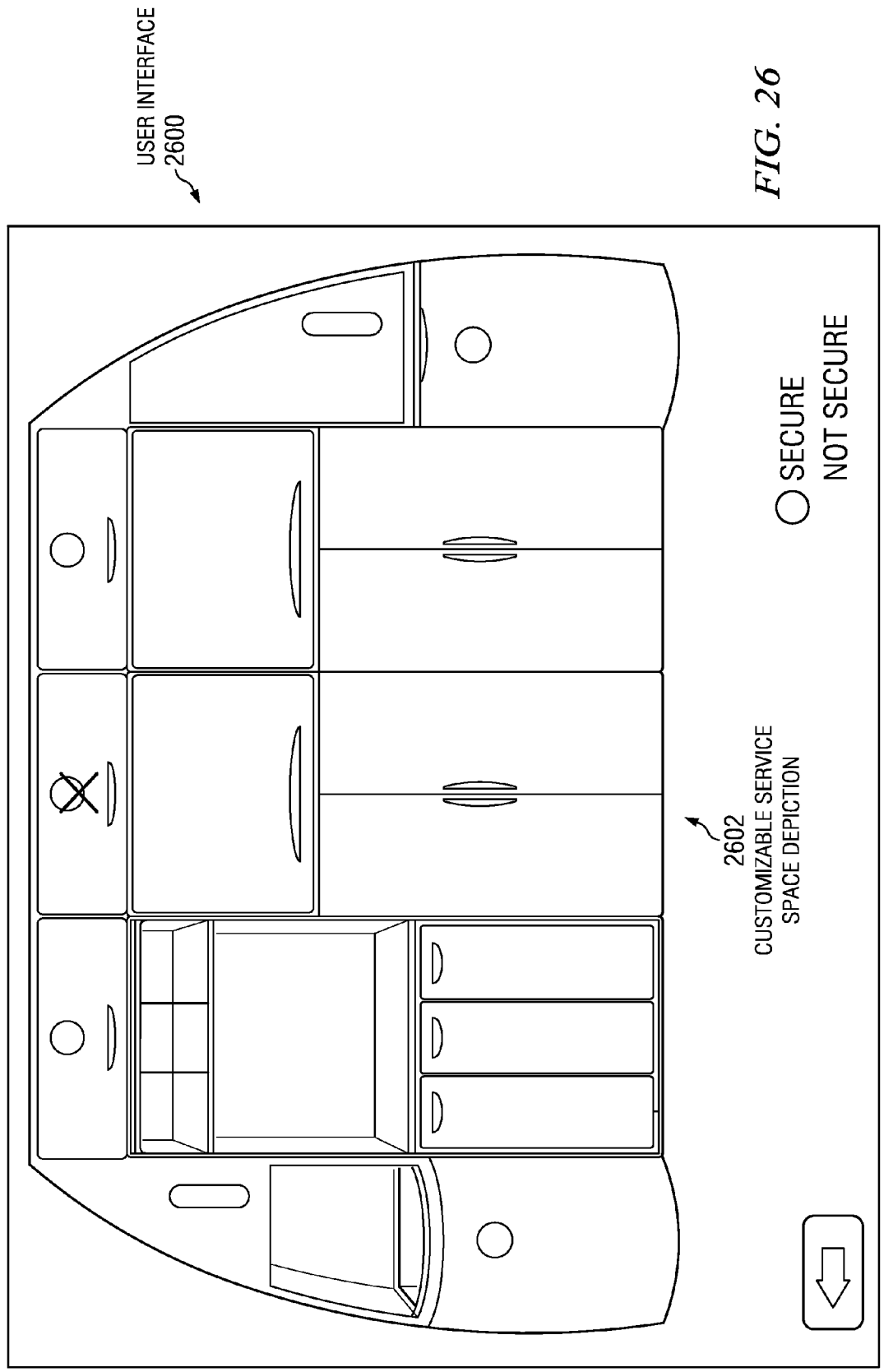
FIG. 26 is an illustration of a user interface in accordance with an illustrative embodiment.

With reference now to FIG. 26, an illustration of a user interface is depicted in accordance with an illustrative embodiment. User interface 2600 may be an example of one implementation of user interface 438 in FIG. 4. User interface 2600 may depict an illustrative example of screen 2016 in FIG. 20.

User interface 2600 may include customizable service space depiction 2602 which provides information about the status of different modules within a customizable service space. For example, the status information may be whether a module is secured for transportation or not, whether a module is accessible or restricted, and/or any other suitable information about a module in a customizable service space.

Figure 27:
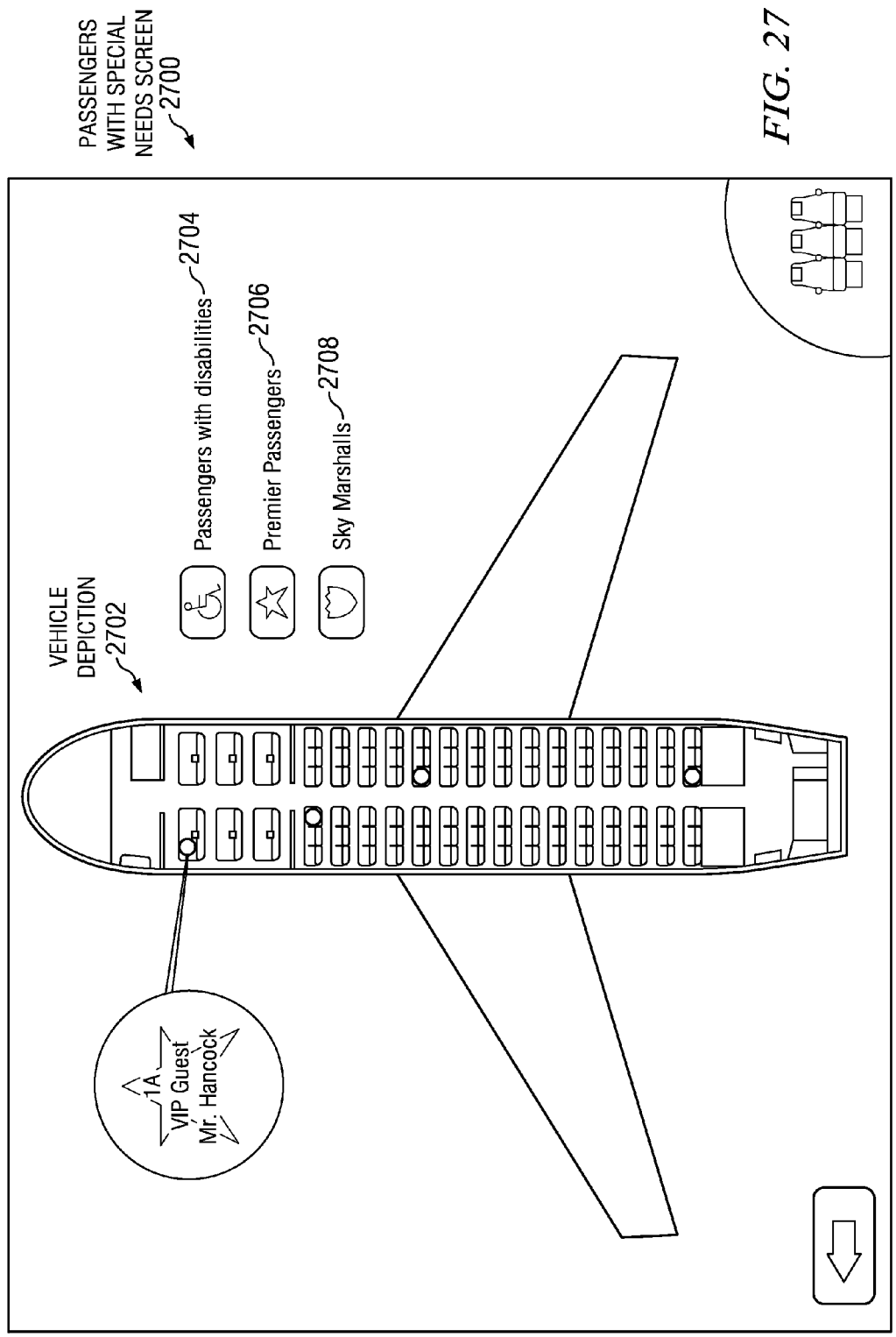
FIG. 27 is an illustration of a passengers with special needs screen in accordance with an illustrative embodiment.

With reference now to FIG. 27, an illustration of a passengers with special needs screen is depicted in accordance with an illustrative embodiment. Passengers with special needs screen 2700 may be an example of a screen presented when passengers with special needs 2024 in FIG. 20 is selected over a user interface, such as user interface 438 in FIG. 4.

Passengers with special needs screen 2700 may include vehicle depiction 2702 having information about passengers, for example. The information about passengers may include, for example, the seating diagram of the vehicle including the specific seating of passengers with disabilities 2704, premier passengers 2706, sky marshals 2708, and other information about passengers on a vehicle.

Figure 28:
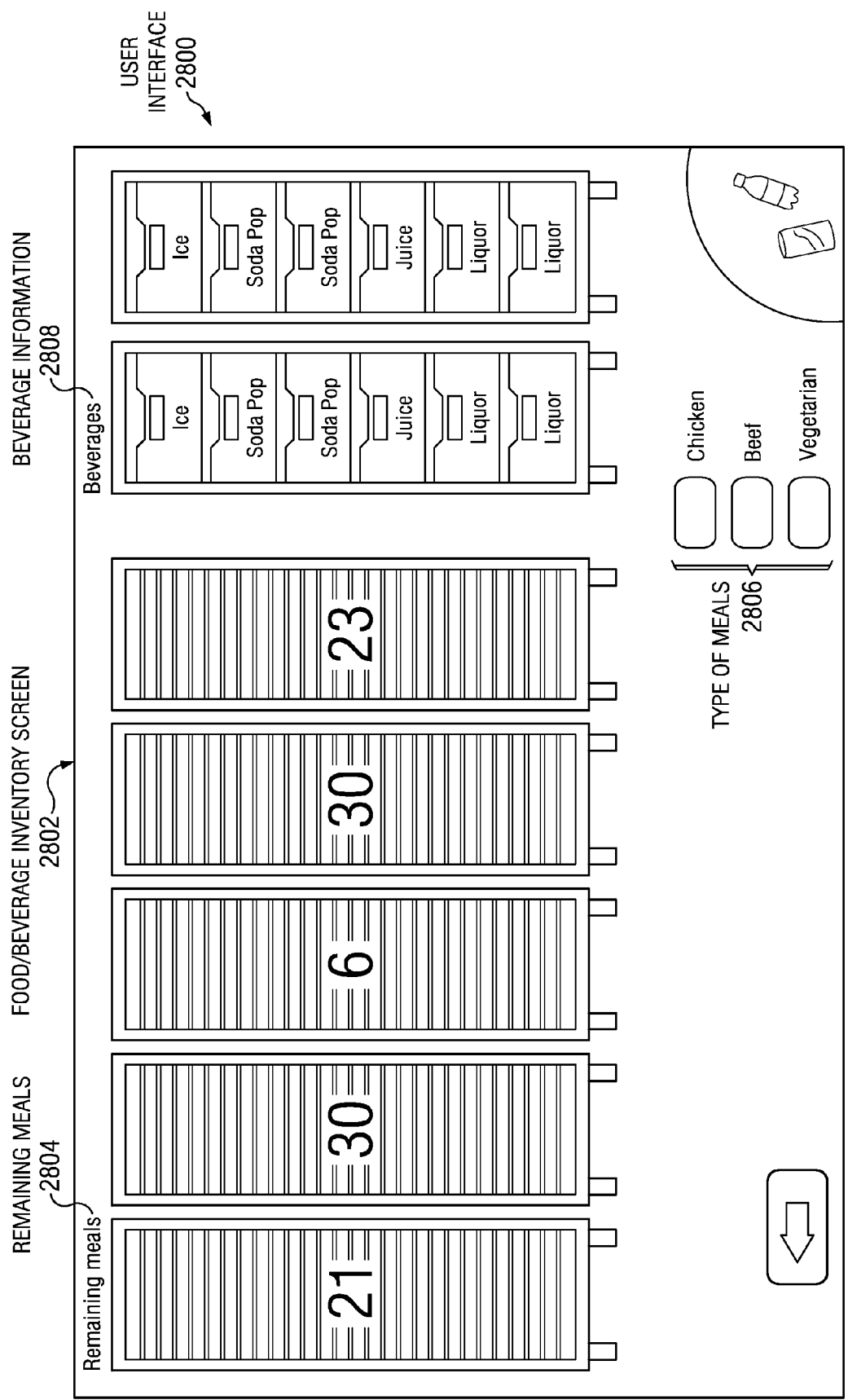
FIG. 28 is an illustration of a user interface in accordance with an illustrative embodiment.

With reference now to FIG. 28, an illustration of a user interface is depicted in accordance with an illustrative embodiment. User interface 2800 may be an example of one implementation of user interface 438 in FIG. 4.

User interface 2800 may depict food/beverage inventory screen 2802. Food/beverage inventory screen 2802 may be an example of a screen that is presented when food/beverage inventory 2022 function is selected in FIG. 20. Food/beverage inventory screen 2802 may depict remaining meals 2804, type of meals 2806, beverage information 2808, and/or any other type of information about food or beverage modules in a customizable service space of a vehicle.

Figure 29:
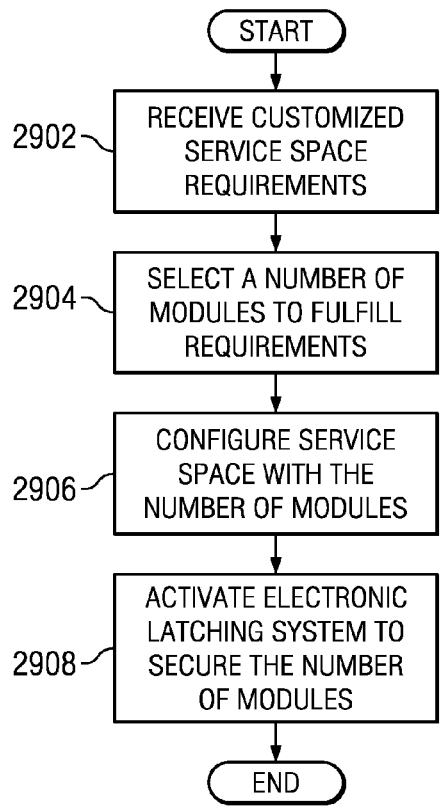
FIG. 29 is an illustration of a flowchart of a process for configuring a customizable service space in accordance with an advantageous embodiment.

With reference now to FIG. 29, an illustration of a flowchart of a process for configuring a customizable service space is depicted in accordance with an advantageous embodiment. The process in FIG. 29 may be implemented by service space control system 406 of FIG. 4.

The process begins by receiving customized service space requirements (operation 2902). The process selects a number of modules to fulfill the requirements (operation 2904). The process then configures the service space with the number of modules (operation 2906). The process activates an electronic latching system to secure the number of modules (operation 2908), with the process terminating thereafter.

Figure 30:
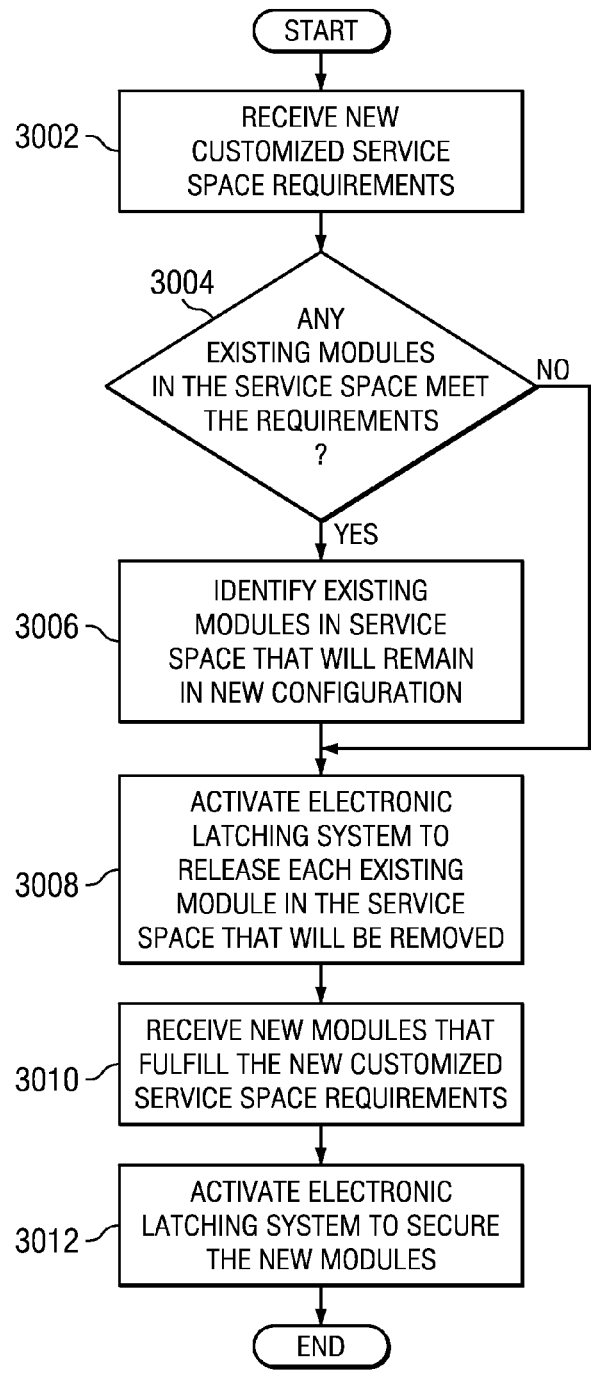
FIG. 30 is an illustration of a flowchart of a process for reconfiguring a customizable service space in accordance with an advantageous embodiment.

With reference now to FIG. 30, an illustration of a flowchart of a process for reconfiguring a customizable service space is depicted in accordance with an advantageous embodiment. The process in FIG. 30 may be implemented by service space control system 406 in FIG. 4.

The process begins by receiving new customized service space requirements (operation 3002). The process determines whether any existing modules in the service space meet the new requirements (operation 3004). If any of the existing modules in the service space meet the new requirements, the process identifies existing modules in the service space that will remain in the new configuration (operation 3006). The process then activates an electronic latching system to release each existing module in the service space that will be removed (operation 3008). If none of the existing modules in the service space meet the new requirements, the process moves to operation 3008.

The process receives new modules that fulfill the new customized service space requirements (operation 3010). The process then activates the electronic latching system to secure the new modules (operation 3012), with the process terminating thereafter.

Figure 31:
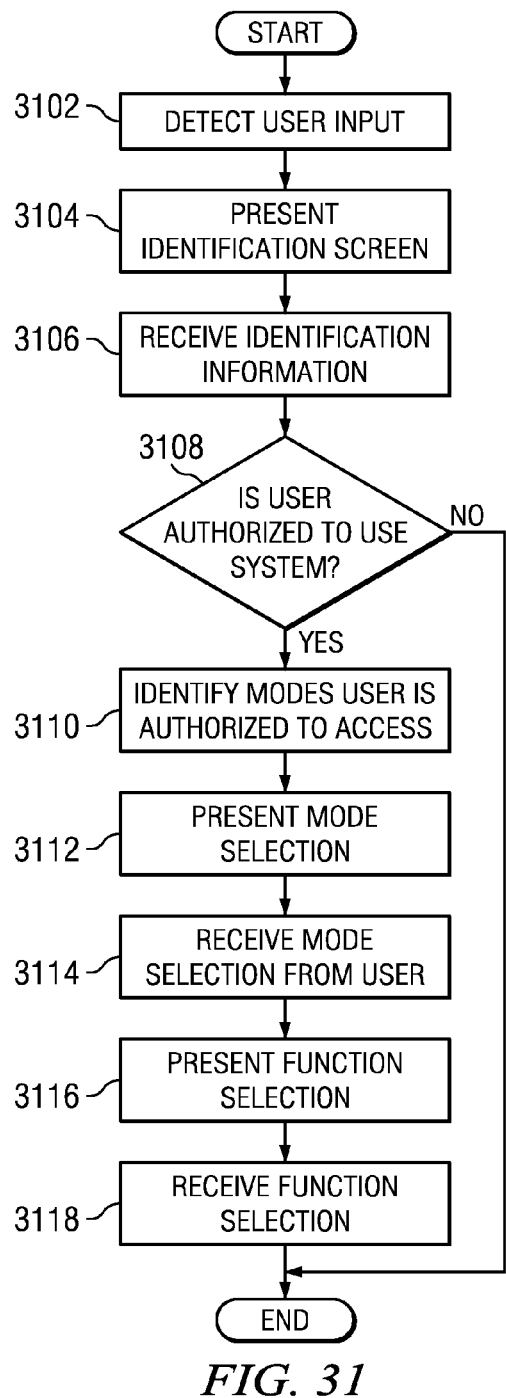
FIG. 31 is an illustration of a flowchart of a process for providing user access to a service space control process in accordance with an advantageous embodiment.

With reference now to FIG. 31, an illustration of a flowchart of a process for providing user access to a service space control process is depicted in accordance with an advantageous embodiment. The process in FIG. 31 may be implemented by user interface 438 of service space control system 406 in FIG. 4.

The process begins by detecting user input (operation 3102). User input may be detected from a touch or presence of a user on a touch screen in one example. In another example, user input may be detected from a peripheral device, such as a mouse or keyboard. In yet another example, user input may be detected over a voice detection system, or any other suitable means for detecting user input.

The process presents an identification screen (operation 3104), providing a user with an area to input identification information. Identification information may be, for example, without limitation, biometric information, a password, a unique identification code, and/or any other identification information capable of being detected by a data processing system. Biometric information may include, for example, a fingerprint, retinal image, and/or any other suitable biometric information. The process receives the identification information (operation 3106), and determines whether the user is authorized to use the system (operation 3108). This determination may be made using a database, such as service space database 442 in FIG. 4, for example, to retrieve identification and/or authentication information of a number of users authorized to use the system, and comparing the stored information with the identification information received in operation 3106. If the user is not authorized to use the system, the process terminates.

If the user is authorized to use the system, the process then identifies the modes the user is authorized to access (operation 3110). For example, a user may be authorized to access one or more modes. The process presents the mode selection (operation 3112). The mode selection may be presented to the user with the specific mode or number of modes that the user is authorized to access, allowing the user to select the mode of the user's choice. If the user is only authorized to access one mode, the mode selection may still be presented with all available modes, but the user may only be able to select the mode the user is authorized to access.

The process receives the mode selection from the user (operation 3114) and then the process presents a function selection (operation 3116). A function selection may display a number of different functional capabilities to be selected by the user. For example, different functional capabilities may include reconfiguration of a customizable service space, electronically unlatching or re-latching a number of modules in a customizable service space, accessing information about passengers in a vehicle, accessing information about a number of modules in a customizable service space, and/or any other suitable functionality.

The process receives a function selection by the user (operation 3118), with the process terminating thereafter. The functional selection may lead to further interactive capabilities by the user with the service space control process, such as data management for example.

Figure 32:
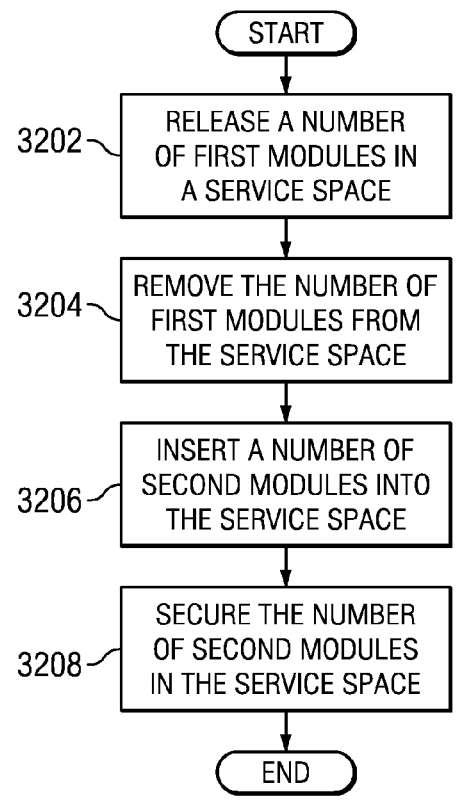
FIG. 32 is an illustration of a flowchart of a process for reconfiguring a customizable service space in accordance with an advantageous embodiment.

With reference now to FIG. 32, an illustration of a flowchart of a process for reconfiguring a customizable service space is depicted in accordance with an advantageous embodiment. The process in FIG. 32 may be executed by a user, such as user 407 in FIG. 4, for example.

The process begins releasing a number of first modules in a service space (operation 3202). The number of first modules may be, for example, a number of modules that were installed in an initial configuration at purchase. The number of first modules may be released by a user, such as user 407 in FIG. 4, interacting with service space control process 440 using user interface 438 to electronically release, or unlatch, the number of first modules, such as number of modules 420 in FIG. 4.

Next, the process removes the number of first modules from the service space (operation 3204). The modules may be physically removed from the service space once they are electronically released, or unlatched, by sliding each module out of the service space, for example. In an illustrative example, where a sliding rail and track system is implemented, each module may slide out of the service space once the module is unlatched and be physically removed from the vehicle.

The process then inserts a number of second modules into the service space (operation 3206). The number of second modules may be modules chosen during a reconfiguration process, such as in FIG. 30 for example. The number of second modules may be selected by a user, such as user 407 in FIG. 4, interacting with service space control process 440 using user interface 438 to reconfigured a customizable service space, such as customizable service space 404 in FIG. 4.

Then the process secures the number of second modules in the service space (operation 3208), with the process terminating thereafter. The number of second modules may be secured by a user, such as user 407 in FIG. 4, interacting with service space control process 440 using user interface 438 to electronically secure, or latch, the number of second modules, such as number of modules 408 in FIG. 4.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments take into account and recognize that currently used galley area configurations for airplanes are configured at purchase to accommodate current market conditions. Standard designs are used and may be modified slightly at initial configuration to meet specific airline customer requirements. However, the different advantageous embodiments recognize that as the markets changes, airlines wish to modify the service and products they offer during in-flight service in order to reduce cost, increase revenue, or both. Modification from the initial at purchase configuration is both costly and time-consuming, and is often poorly executed because the modification desired was not originally anticipated by the initial configuration of the galley area.

The different advantageous embodiments take into account and recognize that current customers of transportation vehicles need a way to efficiently and economically customize the on-board service and product offerings to meet changing conditions. In some cases, current customers purchase standard galley equipment in order to make their airplane attractive for resale at a later date. The galley area configuration in this case is not designed for the current airline customer's in-flight service needs but rather strictly for resale considerations so that costly reconfigurations will not be necessary by the new purchaser at the time of resale.

The different advantageous embodiments also take into account and recognize that airline carriers currently offer in-flight services and products, such as food and beverage service for example. In order to supply drinking water to passengers, an airplane must be stocked with bottled drinking water. Bottled drinking water adds cost to the operations, weight considerations, and a large amount of excess trash. In addition, flight attendants may not have a dedicated hand washing station, and may rely on airplane lavatories, which must be shared with passengers.

Furthermore, the different advantageous embodiments also take into account and recognize that there is a lack of trash storage space on current airplanes. In part due to the bottled drinking water, and also due to the other beverages and food served and brought onto the plane by passengers, there is an increase in trash during in-flight service. Plastic bottles in particular may take up excessive space and airplane galleys have limited storage space in current configurations. Multiple small trash bags are often filled and hung on the front of galley units, stored in lavatories, or stashed elsewhere throughout the airplane, such as underneath a seat.

Thus, one or more of the different advantageous embodiments may provide an apparatus for customizing a service space comprising the service space and a number of modules. The service space is capable of being configured. The number of modules is capable of being removeably attached in a number of locations in the service space.

The different advantageous embodiments further provide a method for customizing a service space using a service space control system. User input is detected through a user interface. An identification screen is presented using the user interface. Identification information is received. A determination is made as to whether a user is authorized to use the service space control system using the identification information.

The different advantageous embodiments provide a system and method for configuration of customer specific modules in a timely and cost effective manner. The system is capable of quick changes and modifications by having a modular space that may be configured with a number of different modules in a number of different configurations. A low-cost carrier or leased aircraft carrier may simply be able to pull out existing modules and insert new modules customized to suit their specific in-flight service plan. The customized service space enables efficient and cost-effective change and customization by using computer generated latching and locking devices that allow for multiple ways to configure a service space without having to modify the vehicle structure. The change may be essentially tool-less, removing existing service modules and installing new modules without tools, and reconfiguring the service space with minimal resources and time. In addition, the service space may be reconfigured for a number of different purposes other than the original purpose of the space at time of purchase. A galley area may become a business center, for example, by simply switching out a number of modules.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A modular environment for a vehicle comprising:
a service space defined within the vehicle;
a mounting system included in the service space;
a number of modules, each module configured with a rail configured to releaseably engage the mounting system; and
a service space control system electronically in communication with at least one of the modules of the number of modules, the service space control system configured to execute a task from a group of tasks, the group consisting of: authenticate personnel, control access, receive data from the service space, present a number of configuration options, generate a message, and combinations thereof, and such that the service space control system comprises a service space database comprising: personnel access information, and module technical specifications comprising: a size, a width, a length, a height, a weight, a material, and a utility requirement, of the at least one of the modules.

2. The modular environment for the vehicle of claim 1 further comprising:
the at least one of the modules including a radio frequency identification tag in electronic communication with the service space control system.

3. The modular environment for the vehicle of claim 1 further comprising:
the service space control system including at least one radio frequency identification reader configured to identify the at least one of the modules.

4. The modular environment for the vehicle of claim 1 further comprising:
such that the mounting system comprises a track system disposed along a floor surface of the service space;
the at least one of the modules including an electronic latching system; and
the service space control system is configured to control the electronic latching system.

5. The modular environment for the vehicle of claim 1 further comprising:
the at least one of the modules including a radio frequency identification tag configured to communicate with the service space control system about contents of the at least one of the modules.

6. The modular environment for the vehicle of claim 1 further comprising:
an arch framework included within the service space.

7. The modular environment for the vehicle of claim 6 further comprising:
the arch framework includes a number of fixed modules and a number of configurable modules.

8. The modular environment of claim 7 further comprising:
the number of fixed modules includes at least one of a water unit and a waste unit.

9. The modular environment of claim 7 further comprising:
a utility system configured to supply power and water to at least one of the number of modules.

10. The modular environment of claim 1, wherein the vehicle is selected from at least one of an aircraft, a train, a ship, a bus, a spacecraft, and a submarine.

11. The modular environment of claim 1, wherein the mounting system further includes a track system having a number of tracks.

12. A method for using a service space control system that is configured to control a modular environment for a vehicle having a configurable service defined therein; including a mounting system configured to releaseably engage a number of modules in a service space, the number of modules comprising a rail configured to engage a track in the service space, wherein the service space control system is electronically in communication with at least one of the modules of the number of modules and configured to control a number of tasks from a group of tasks, the group consisting of: present a number of different configuration options, control module access, control module latching, identify the at least one of the modules, and combinations thereof, the method comprising:
storing in a service space database: personnel identification information, personnel access information, service space specification information, module specification information, and module identification information;
detecting user input through a user interface of the service space control system;
presenting an identification screen using the user interface;
receiving identification information; and
determining, using the identification information, whether to authorize access to the service space control system.

13. The method of claim 12, further comprising:
responsive to a determination that the user is authorized to use the service space control system, identifying a number of modes the user is authorized to access using the identification information.

14. The method of claim 13 further comprising:
releasing a number of first modules in the service space in response to the determination.

15. The method of claim 13 further comprising:
enabling insertion of a number of second modules into the service space in response to the determination.

16. A modular environment for a vehicle comprising:
a customizable service space defined within the vehicle, wherein the customizable service space comprises a reconfigurable area configured to perform at least one use from a group of uses consisting of: a lavatory, a seating area, a retail space, a bar unit, a storage unit, a countertop unit, a business center, a desk unit, a communication unit, a hand washing station, a water dispensing component, and a galley unit, wherein the galley unit comprises at least one of: an oven, a coffee maker, a hot cup, a galley cart, a food storage unit, a beverage storage unit, and combinations thereof, and further wherein the customizable service space is reconfigurable to perform at least one other use from the group of uses, or a combination thereof; the water dispensing component configured to contain a sub-component from a group of sub-components, the group consisting of: a filtration system, a faucet, a sink, a container for collecting dispensed water, a drain, a water storage unit, an ice maker, a heating unit, a refrigeration unit, and/or any other suitable water unit component, and combinations thereof, and further wherein the customizable service space is reconfigurable without suspending revenue generating operation of the vehicle;
a mounting system included in the customizable service space, wherein the mounting system comprises at least a track system in a floor of the customizable service space;
a number of modules, each module configured with a rail configured to releaseably engage the mounting system;
a service space control system in electronic communication with at least one module of the number of modules, such that the service space control system comprises: a first system configured to identify the at least one module, and a second system configured to provide a number of different configuration options for the number of modules comprising the customizable service space, based upon technical specifications for the number of modules, the technical specifications being stored in a service space database.

17. The modular environment of claim 1, wherein the service space is configured to be reconfigurable to a use comprising at least one of: a lavatory, a seating area, a retail space, a bar unit, a storage unit, a countertop unit, a business center, a desk unit, a communication unit, a hand washing station, a water dispensing component, and a galley unit, wherein the galley unit comprises at least one of: an oven, a coffee maker, a hot cup, a galley cart, a food storage unit, and a beverage storage unit, and further wherein the water dispensing component comprises at least one of: a filtration system, a faucet, a sink, a container for collecting dispensed water, a drain, a water storage unit, an ice maker, a heating unit, a refrigeration unit, and/or any other suitable water unit component.

18. The modular environment of claim 1, wherein the service space control system is configured to customize the service space and is further configured to track and control which use a particular module is performing, and wherein the service space control system is further configured to facilitate at least one of: a module reconfiguration, a module service, a manual module function, and an automatic module function, wherein the automatic module function is selected from a group of functions, the group consisting of: generation of a galley equipment report log, control of a cabin, tracking of an inventory, a revenue tracking system, control of connecting information, control of a passenger manifest, management of information, functionality of a transportation carrier, and combinations thereof.

19. The modular environment of claim 1 further comprising at least one of the modules of the number of modules comprising a sliding compartment, configured such that an interior of the compartment is accessible from outside the vehicle.

20. The modular environment of claim 1 further comprising at least one of the modules of the number of modules configured such that the rail is disposed along a bottom surface of the at least one of the modules.

* * * * *